(12) United States Patent
Ozay et al.

(10) Patent No.: US 11,242,059 B2
(45) Date of Patent: Feb. 8, 2022

(54) INTENTION-AWARE SUPERVISORY CONTROL WITH DRIVING SAFETY APPLICATIONS

(71) Applicant: THE REGENTS OF THE UNIVERSITY OF MICHIGAN

(72) Inventors: Necmiye Ozay, Ann Arbor, MI (US); Yunus E. Sahin, Ann Arbor, MI (US); Zexiang Liu, Ann Arbor, MI (US); Kwesi Rutledge, Ann Arbor, MI (US); Sze Zheng Yong, Mesa, AZ (US); Dimitra Panagou, Ann Arbor, MI (US)

(73) Assignees: THE REGENTS OF THE UNIV. OF MICHIGAN, Ann Arbor, MI (US); AZ BRD REGENTS ON BEHALF OF AZ STATE UNIV., Scottsdale, AZ (US)

( * ) Notice: Subject to any disclaimer, the term of this patent is extended or adjusted under 35 U.S.C. 154(b) by 123 days.

(21) Appl. No.: 16/394,508

(22) Filed: Apr. 25, 2019

(65) Prior Publication Data
US 2020/0339123 A1    Oct. 29, 2020

(51) Int. Cl.
*B60W 30/18* (2012.01)
*B60W 50/14* (2020.01)
(Continued)

(52) U.S. Cl.
CPC .. *B60W 30/18163* (2013.01); *B60W 30/0956* (2013.01); *B60W 50/14* (2013.01); *G08G 1/167* (2013.01); *B60W 2050/143* (2013.01)

(58) Field of Classification Search
CPC ............. B60W 30/0956; B60W 50/14; B60W 2050/143; G08G 1/167
See application file for complete search history.

(56) References Cited

U.S. PATENT DOCUMENTS

| 9,915,948 | B2  | 3/2018  | Di Cairano et al. |
| 2017/0101102 | A1* | 4/2017 | Matei ............... G08G 1/167 |
| 2018/0281785 | A1 | 10/2018 | Berntorp et al. |

FOREIGN PATENT DOCUMENTS

| FR | 2787081 B1 | 1/2001 |
| FR | 2812413 B1 | 8/2004 |
| GN | 107150680 A | 9/2017 |

OTHER PUBLICATIONS

Althoff, et al., Online Verification of Automated Road Vehicles Using Reachability Analysis, IEEE Transactions on Robotics, 2014, 30(4):903-918.
(Continued)

*Primary Examiner* — Michael D Lang
(74) *Attorney, Agent, or Firm* — Quarles & Brady LLP

(57) ABSTRACT

In one aspect, the present disclosure provides a method in a data processing system comprising at least one processor and at least one memory, the at least one memory comprising instructions executed by the at least one processor to implement a vehicle overtaking monitoring system. The method comprises receiving, from a first plurality of sensors coupled to an ego vehicle, lead vehicle data about a lead vehicle, inferring an estimated intention of the lead vehicle based on the lead vehicle data, selecting an intention model from a plurality of intention models based on the estimated intention, calculating a set of permissible driving inputs of the ego vehicle based on the intention model, calculating at least one driver input range based on the set of permissible driving inputs, and causing the at least one driver input range to be displayed to a driver of the ego vehicle.

20 Claims, 10 Drawing Sheets

(51) Int. Cl.
B60W 30/095 (2012.01)
G08G 1/16 (2006.01)

(56) References Cited

OTHER PUBLICATIONS

Ames, et al., Control Barrier Function Based Quadratic Programs for Safety Critical Systems, IEEE Transactions on Automatic Control, 2016, 62(8):3861-3876.
Bansal, et al., Hamilton-Jacobi Reachability: A Brief Overview and Recent Advances, In 2017 IEEE 56th Annual Conference on Decision and Control (CDC), pp. 2242-2253.
Bertsekas, et al., Infinite Time Reachability of State-Space Regions by Using Feedback Control, IEEE Transactions on Automatic Control, 1972, 17(5):604-613.
Blanchini, et al., Set Invariance in Control, Automatica, 1999, 35(11):1747-1767.
Chen, et al., Modelling of Uncertain Reactive Human Driving Behavior: A Classification Approach, In 2018 IEEE Conference on Decision and Control (CDC), pp. 3615-3621.
Cheong, et al., Input Design for Discrimination Between Classes of LTI Models, Automatica, 2015, 53:103-110.
De Santis, et al., Computation of Maximal Safe Sets for Switching Systems, IEEE Transactions on Automatic Control, 2004, 49(2):184-195.
Ding, et al., Optimal Input Design for Affine Model Discrimination with Applications in Intention-Aware Vehicles, In Proceedings of the 9th ACM/IEEE International Conference on Cyber-Physical Systems, IEEE Press, 2018, pp. 297-307.
Harirchi, et al., Passive Diagnosis of Hidden-Mode Switched Affine Models with Detection Guarantees via Model Invalidation, In Diagnosability, Security and Safety of Hybrid Dynamic and Cyber-Physical Systems, 2018, pp. 227-251.
Herceg, et al., Multi-Parametric Toolbox 3.0, In 2013 European Control Conference (ECC), pp. 502-510.
Kumar, et al., Learning-Based Approach for Online Lane Change Intention Prediction, In 2013 IEEE Intelligent Vehicles Symposium (IV), pp. 797-802.
Ma, et al., Improved Robustness and Safety for Autonomous Vehicle Control with Adversarial Reinforcement Learning, In 2018 IEEE Intelligent Vehicles Symposium (IV), pp. 1665-1671.
Nguyen, et al., CAPIR: Collaborative Action Planning with Intention Recognition, In Seventh Artificial Intelligence and Interactive Digital Entertainment Conference, 2011, pp. 61-66.
Nilsson, et al., Correct-By-Construction Adaptive Cruise Control: Two Approaches, IEEE Transactions on Control Systems Technology, 2015, 24(4):1294-1307.
O'Kelly, et al., Computer-Aided Design for Safe Autonomous Vehicles, In 2017 Resilience Week (RWS), IEEE, pp. 90-96.
Pek, et al., Efficient Computation of Invariably Safe States for Motion Planning of Self-Driving Vehicles, In 2018 IEEE/RSJ International Conference on Intelligent Robots and Systems (IROS), pp. 3523-3530.
Rungger, et al., Computing Robust Controlled Invariant Sets of Linear Systems, IEEE Transactions on Automatic Control, 2017, 62(7):3665-3670.
Sadigh, et al., Information Gathering Actions Over Human Internal State, In 2016 IEEE/RSJ International Conference an Intelligent Robots and Systems (IROS), pp. 66-73.
Thilen, Robust Model Predictive Control for Autonomous Driving, KTH Skolan For Elektro-Och Systemteknik, 2017, 60 pages.

\* cited by examiner

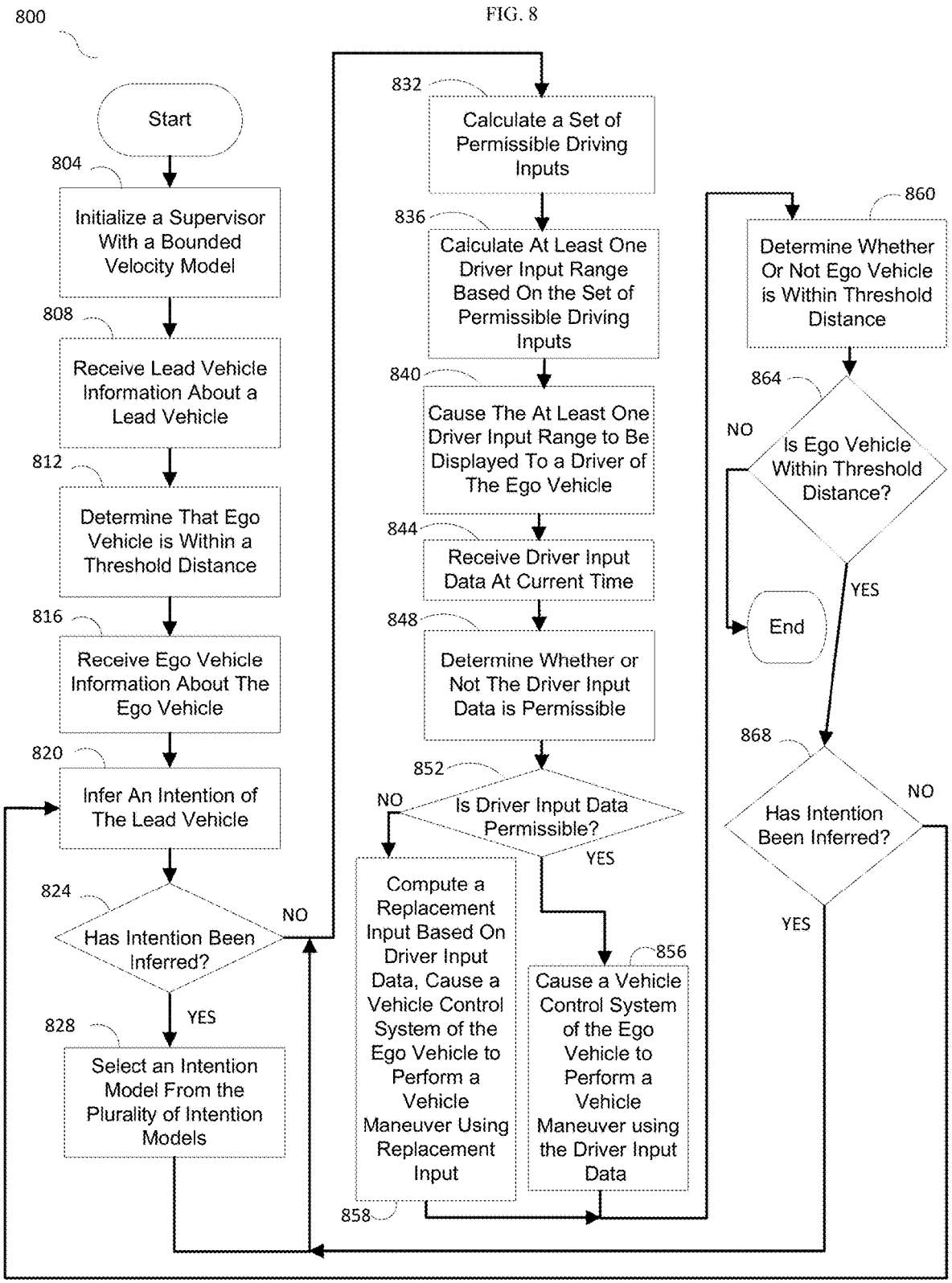

INTENTION-AWARE SUPERVISORY CONTROL WITH DRIVING SAFETY APPLICATIONS

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to supervisory control with driving safety applications, in particular, to the supervising of overtaking of a lead vehicle by an ego vehicle.

2. Description of the Related Art

As more and more autonomy-related functionality are integrated into modern passenger vehicles, questions on safety and trust arise. Some recent research efforts have tried to address the safety issue from the formal verification Ref. (1), Ref. (16) and correct-by-construction control synthesis perspectives Ref. (15). In these formal approaches, set invariance plays a central role in guaranteeing safety Ref. (5), Ref. (17). The boundary of an invariant set can be thought of as a barrier that separates the part of the state-space the system can safely operate in from the part that is deemed unsafe. This boundary can be represented by level-sets of differentiable functions Ref. (2), polyhedra, or approximate solutions of partial differential equations capturing the safety problem Ref. (3).

Finding robust controlled invariant sets, sets that can be rendered invariant with the right choice of control inputs in a way that is robust to the factors controlled by external agents (such as behavior of other drivers, disturbances) and model uncertainty, is a key problem in safety control.

Therefore, what is needed is an improved method for supervising an overtaking of a lead vehicle by an ego vehicle.

SUMMARY OF THE INVENTION

The present disclosure provides a method of supervising the overtaking of a lead vehicle by an ego vehicle using an inferred intention of the lead vehicle.

In one aspect, the present disclosure provides a method in a data processing system comprising at least one processor and at least one memory, the at least one memory comprising instructions executed by the at least one processor to implement a vehicle overtaking monitoring system. The method comprises receiving, from a first plurality of sensors coupled to an ego vehicle, lead vehicle data about a lead vehicle, inferring an estimated intention of the lead vehicle based on the lead vehicle data, selecting an intention model from a plurality of intention models based on the estimated intention, calculating a set of permissible driving inputs of the ego vehicle based on the intention model, calculating at least one driver input range based on the set of permissible driving inputs, and causing the at least one driver input range to be displayed to a driver of the ego vehicle.

The method may include receiving, from a second plurality of sensors coupled to the ego vehicle, ego vehicle data about the ego vehicle, and the set of permissible driving inputs may be further calculated based on the ego vehicle data.

In the method, the first plurality of sensors and the second plurality of sensors may include a common sensor.

The method may include calculating a state of the ego vehicle and the lead vehicle based on the ego vehicle data and the lead vehicle data, and the set of permissible driving inputs may be further calculated based on the state of the ego vehicle and the lead vehicle.

In the method, the ego vehicle data may include a velocity of the ego vehicle and a position of the ego vehicle, and the lead vehicle data may include a velocity of the lead vehicle.

In the method, each permissible driving input of the set of permissible driving inputs may include a longitudinal acceleration of the ego vehicle and a lateral velocity of the ego vehicle.

In the method the at least one driver input range may include a range of longitudinal vehicle velocities of the ego vehicle.

The method may include determining that the ego vehicle is within a threshold distance of the lead vehicle, and the plurality of intention models may include an annoying intention model corresponding to the lead vehicle speeding up when the ego vehicle is within the threshold distance, and a cautious intention model corresponding to the lead vehicle slowing down when the ego vehicle is within the threshold distance.

In the method, each intention model of the plurality of intention models may include a robust controlled invariant set calculated based on a dynamics model associated with one of the annoying intention model or the cautious intention model.

In another aspect, the present disclosure provides a method in a data processing system comprising at least one processor and at least one memory, the at least one memory comprising instructions executed by the at least one processor to implement a vehicle overtaking monitoring system. The method includes receiving, from a first plurality of sensors coupled to an ego vehicle, lead vehicle data about a lead vehicle, estimating an intention of the lead vehicle based on the lead vehicle data, selecting a target intention model from a plurality of intention models based on the estimated intention, calculating a set of permissible driving inputs of the ego vehicle based on the target intention model, receiving, from a second plurality of sensors coupled to the ego vehicle, driver input data, determining that the driver input data is not permissible based on the set of permissible driving inputs, and causing a vehicle control system of the ego vehicle to perform a vehicle maneuver in response to determining that the driver input data is not permissible.

In the method, each intention model of the plurality of intention models may include a robust controlled invariant set calculated based on a dynamics model associated with the intention model.

In the method, each permissible driving input of the set of permissible driving inputs may have a plurality of permissible values corresponding to predetermined operational parameters of the ego vehicle, and the method may further include calculating a projected driving input based on the driver input data, the projected driving input having a plurality of projected values corresponding to predetermined operational parameters, selecting a target permissible driving input from the set of permissible driving inputs, wherein the target permissible driving input has at least one permissible value that matches a corresponding projected value of the projected driving input, and calculating the vehicle maneuver based on the target permissible driving input.

In the method, the target permissible driving input and the corresponding projected value may each correspond to a preferred operational parameter selected by a driver of the ego vehicle.

In the method, each permissible driving input of the set of permissible driving inputs may include a longitudinal acceleration of the ego vehicle and a lateral velocity of the ego vehicle.

The method may include determining that the driver input data is permissible based on the set of permissible driving inputs, and providing the driver input data to the vehicle control system in response to determining that the driver input data is permissible.

In yet another aspect, the present disclosure provides a driving control system for an ego vehicle, the driving control system including a first plurality of sensors coupled to the ego vehicle, a controller in electrical communication with the first plurality of sensors, the controller being configured to execute a program to receive, from the first plurality of sensors coupled to the ego vehicle, lead vehicle data about a lead vehicle, estimate an intention of the lead vehicle based on the lead vehicle data, select an intention model from a plurality of intention models based on the estimated intention, the intention model having an associated inherent intention, calculate a set of permissible driving inputs of the ego vehicle based on the intention model, calculate at least one driver input range based on the set of permissible driving inputs, and cause the at least one driver input range to be displayed to a driver of the ego vehicle.

The system may further include a second plurality of sensors coupled to the ego vehicle, and the controller may be further configured to receive ego vehicle data about the ego vehicle from the second plurality of sensors coupled to the ego vehicle, and the set of permissible driving inputs may be further calculated based on the ego vehicle data.

In the system, the controller may be further configured to determine that the ego vehicle is within a threshold distance of the lead vehicle, and the plurality of intention models may include an annoying intention model corresponding to the lead vehicle speeding up when the ego vehicle is within the threshold distance, and a cautious intention model corresponding to the lead vehicle slowing down when the ego vehicle is within the threshold distance.

In the system, each intention model of the plurality of intention models may include a robust controlled invariant set calculated based on a dynamics model associated with one of the annoying intention model or the cautious intention model.

The system may further include a second plurality of sensors coupled to the ego vehicle, and the controller may be further configured to receive, from the second plurality of sensors, driver input data determine that the driver input data is not permissible based on the set of permissible driving inputs; and cause a vehicle control system of the ego vehicle to perform a vehicle maneuver in response to determining that the driver input data is not permissible.

These and other features, aspects, and advantages of the present invention will become better understood upon consideration of the following detailed description, drawings and appended claims.

BRIEF DESCRIPTION OF THE DRAWINGS

FIG. 8 shows an exemplary embodiment of a process for implementing a supervisory system for monitoring an overtaking of a lead vehicle by an ego vehicle.

DETAILED DESCRIPTION OF THE INVENTION

Figure 1:
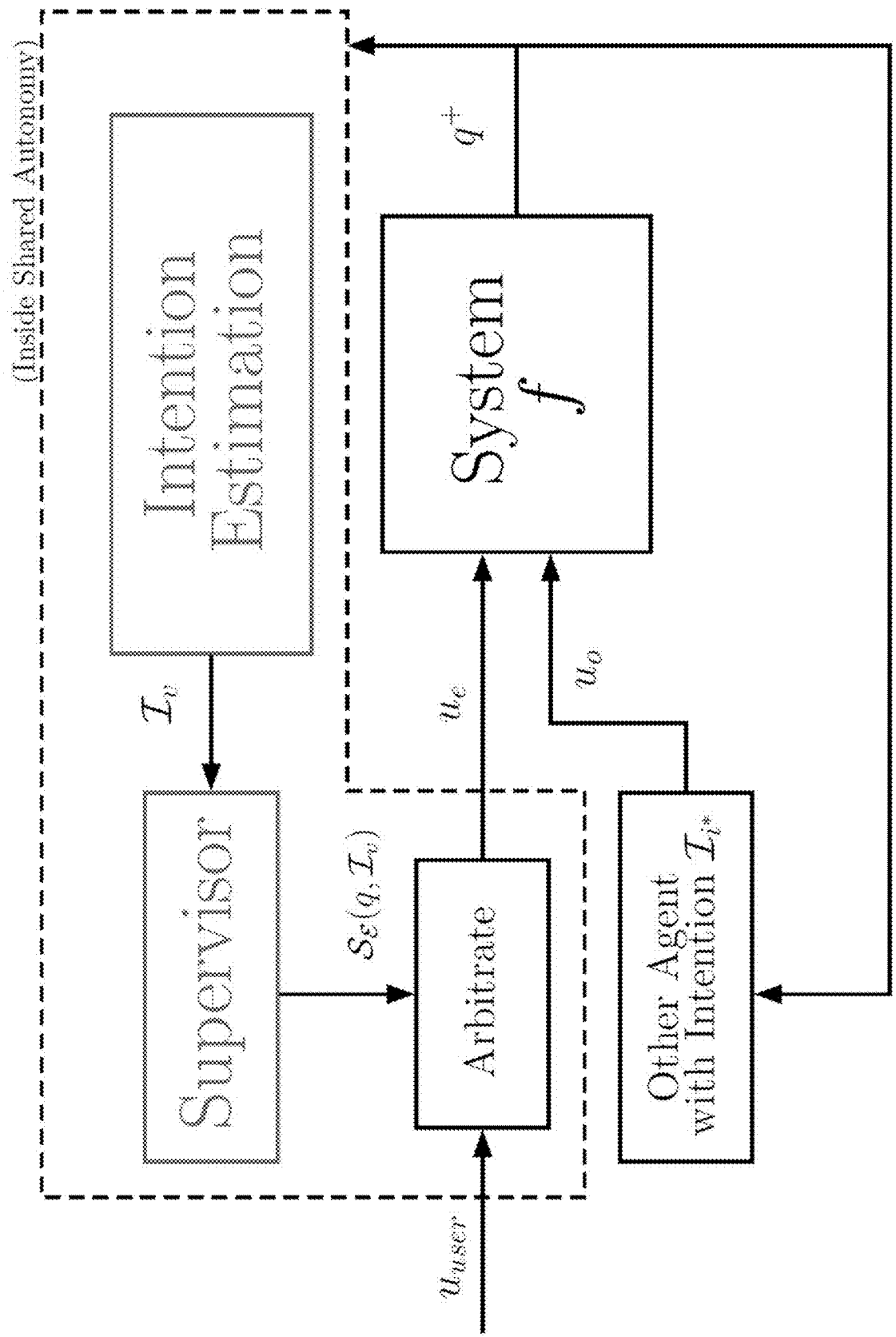
FIG. 1 shows a guardian architecture in accordance with embodiments of this disclosure.

Elements of this disclosure could provide new consumer protections by providing a supervisor system for monitoring an ego vehicle during an overtaking of a lead vehicle.

This disclosure proposes a guardian architecture, including an estimation and a supervisor module providing a set of inputs that guarantees safety, in driving scenarios. The main idea is to offline compute a library of robust controlled invariant sets (RCIS), for each possible driver intention model of the other vehicles, together with an intention-agnostic albeit conservative RCIS. Then, at run-time, when the intention estimation module determines which driver model the other vehicles are following, the appropriate RCIS is chosen to provide the safe and less conservative input set for supervision. We show that the composition of the intention estimation module with the proposed intention-aware supervisor module is safe. Moreover, we show how to compute intention-agnostic and intention-specific RCIS by growing an analytically found simple invariant safe set. The results are demonstrated on a case study on how to safely interact with a human-driven car on a highway scenario, using data collected from a driving simulator.

Introduction

In a driving scenario, trying to develop a single model that covers all possible behaviors of the other drivers often leads to conservatism, i.e., smaller invariant sets, as we assume the worst-case scenario in the invariant set computation. The goal of this disclosure is to show how online estimation of the behavior models (or intentions) of other drivers can reduce conservatism by developing a library of RCIS offline for different intention models and selecting an appropriate one at run-time. Learning or extracting models/intentions of other drivers or learning controllers that mimic humans Ref. (6), Ref. (19), Ref. (13) are relevant, yet orthogonal, to our work as our main focus is to develop a framework to show how such models and their online estimation can lead to more permissive yet safe driving.

Preliminaries

This section introduces the notation and provides certain concepts that are used throughout the rest of the disclosure. For a given set S, $\mathcal{P}_{\geq n}(S)$ denotes the set of subsets of S with at least n elements, S* is the set of all finite sequences from S (including the empty sequence). A discrete-time affine system has the following state update equation:

$$q^+ = Aq + Bu + B_w w + F \quad (1)$$

where q is the state of the system, u is the controlled input to the system, w is the uncontrolled input (disturbance), and the matrices (A, B, $B_w$, F) are of the appropriate dimensions. The state space, space of allowed inputs, and the space of feasible uncontrolled inputs are referred to as $\mathcal{Q}$, $\mathcal{U}$ and $\mathcal{W}$, respectively.

A piecewise-affine (PWA) system is defined by a set $f = \{(f^i, D^i)\}_{i=1}^m$ that describes the evolution of the states in different regions of the state space, that is $$q^+ = f^i(q, u, w) \text{ for } q \in D^i \quad (2)$$

where $\mathcal{D} = \{D^i\}_{i=1}^m$ form a partition of the state space $\mathcal{Q}$ and each $f^i: D^i \times \mathcal{U} \times \mathcal{W} \mapsto \mathcal{Q}$ is a discrete-time affine system in the form of (1), denoting the dynamics used in $D_i$. With a slight abuse of notation, we also write $$q^+ = f(q, u, w) \quad (3)$$

to represent the PWA system corresponding to f.

Given a PWA system f, a set $\mathcal{C} \subseteq \mathcal{Q}$ of states is called robust controlled invariant if $$\forall q \in \mathcal{C} \; \exists u \in \mathcal{U} \; \forall w \in \mathcal{W} : f(q, u, w) \in \mathcal{C} \quad (4)$$

In words, this means that trajectories that start inside an RCIS can be enforced to stay there indefinitely.

Invariant Set Computation

There are many methods in the literature for computing or approximating controlled invariant sets. See Ref. (4), Ref. (5), Ref. (8), and Ref. (18). The main computational building block of these algorithms is the one-step backward reachable set operation, that we denote as Pre(·). For a given set R and dynamics f, the one-step backward reachable set of R under f is defined as $$\text{Pre}^f(R) = \{q \in \mathcal{Q} \; \exists u \in \mathcal{U} : f(q, u, \mathcal{W}) \subseteq R\} \quad (5)$$

Given a safe set $Q_{safe}$, under mild conditions, the following iterations converge from outside to the maximal controlled invariant set in $Q_{safe}$ when initialized with $\mathcal{C}_0 = Q_{safe}$:

$$\mathcal{C}_{i+1} = \text{Pre}^f(\mathcal{C}_i) \cap Q_{safe} \quad (6)$$

If the update rule reaches a fixed point, i.e., $\mathcal{C}_i \subseteq \text{Pre}^f(\mathcal{C}_i)$, then the solution to that equation is the maximal invariant set contained in $Q_{safe}$. On the other hand, although this is a monotonically non-increasing (in the set inclusion sense) sequence, the iterations are not guaranteed to terminate in finitely many steps, a problem that can be mitigated by approximation techniques Ref. (8), Ref. (18).

Alternatively, if one has an initial simple RCIS $\mathcal{C}_0$, computed either analytically or numerically, contained in some safe set $Q_{safe}$, this set can be progressively expanded again via the same update rule (6). In this case, we obtain a monotonically non-decreasing sequence of sets $\Gamma_k = \cup_{i=1}^k \mathcal{C}_i$, each of which themselves are robustly controlled invariant. Therefore, it can be terminated at any time and one would obtain an RCIS. We call this method the inside-out algorithm.

Crucially, for PWA systems and sets described with unions of polytopes, the invariant set computation reduces to a set of polytopic operations. Moreover, when finding the exact Pre(·) is computationally hard, using an under-approximation does not compromise correctness when using the iterative algorithms in the sense that upon termination, the algorithm still results in an RCIS.

Problem Statement and Architecture

We start by describing the abstract problem that we are interested in solving. Let PWA system f of the form (3) represent the interaction of an ego agent with other agents where $q \in \mathcal{Q}$ is the combined states of all agents, control input $u = [u_e^T u_o^T]^T \in \mathcal{U}_e \times \mathcal{U}_o$ is partitioned into two parts where ego input $u_e$ is controlled by the ego agent and external input $u_o$ is controlled by all other agents, and disturbance $w \in \mathcal{W}$ captures model uncertainty. We assume that the other agents behave according to a fixed intention model $I_{i*}: \mathcal{Q} \to \mathcal{P}_{\geq 1}(\mathcal{U}_o)$, which is a set valued mapping that returns a set of external control inputs given a state. That is, if the system is currently at q, then the external control input $u_o$ is restricted such that $u_o \in I_{i*}(q) \subseteq \mathcal{U}_o$. While the actual specific intention model $I_{i*}$ is unbeknownst to the ego agent, a finite set $\mathcal{I} = \{I_1, \ldots, I_n\}$ of intention models is known a priori such that $I_{i*} \in \mathcal{I}$. Each intention model can correspond to a different driving behavior, such as slowing down, speeding up, changing lanes, etc. There are two sources of uncertainty from the perspective of the ego agent: one due to the fact that i* is not known, another due to $I_{i*}$ being a set-valued map, capturing the variability within a specific intention. With a slight abuse of notation, we define $\mathcal{I}(q) = \cup_{I \in \mathcal{I}} I(q)$, the set of all possible external control inputs that the ego agent presumes, given the current state q.

Our goal is to design a supervisor module, which restricts the inputs of the ego agent when needed, to ensure that the states of the system remain indefinitely in a safe set $Q_{safe} \subseteq \mathcal{Q}$. However, due to the dynamics and disturbances in (3), we can only enforce that the system stays in a subset of $Q_{safe}$, which is an RCIS that is computed according to the Invariant Set Computation section above.

Let us define a supervisor module before stating the problem of interest formally.

Definition 1. Given a system in the form of (3), a set of intention models $\mathcal{I}$, and a safe set $Q_{safe}$, a supervisor module $$\mathcal{S}_\mathcal{I}: Q_{safe} \mapsto \mathcal{P}(\mathcal{U}_e) \quad (7)$$

takes a state measurement q and outputs a set $\mathcal{S}_\mathcal{I}(q) \subseteq \mathcal{U}_e$ of admissible ego inputs such that the admissible inputs $u_e \in \mathcal{S}_\mathcal{I}(q)$ enforce the system to indefinitely remain in the safe set regardless of the external input and the disturbance, i.e., $\mathcal{S}_\mathcal{I}(q) \neq \emptyset \Rightarrow \mathcal{S}_\mathcal{I}(q^+) \neq \emptyset$ for all $u_e \in \mathcal{S}_\mathcal{I}(q)$, $u_o \in \mathcal{I}(q)$ and $w \in \mathcal{W}$ where $q^+ = f(q, u, w)$.

A supervisor's goal is to keep the system in the safe set. If the admissible ego input safe is empty, the system must either be in an unsafe state, or it is not possible for the ego agent to guarantee that the system stays in the safe set indefinitely. That is, there exists a finite sequence of external inputs, over which the ego agent has no control, and a finite sequence of disturbances that would eventually steer the system into an unsafe state, regardless of the ego input. On the other hand, the above definition implies that the set $C = \{q \in Q_{safe} | S_J(q) \neq \emptyset\}$ is an RCIS. Given two supervisors $S_J^1$ and $S_J^2$, we say $S_J^1$ is more permissive if $S_J^2(q) \subseteq S_J^1(q)$ for all $q \in Q_{safe}$. The key insight in this disclosure is that, intuitively, smaller set of intention models should lead to more permissive supervisors. That is, if $\tilde{J} \subset J$, for any $S_J$, there exists $S_{\tilde{J}}$ that is more permissive.

We now formally define the problem we are interested in solving and provide a solution method.

Problem 1. Let a PWA system f in the form of (3), a set of intention models $J$ and a safe set $Q_{safe} \subset Q$ be given. Find a supervisor module S as in Definition 1 and a set of initial states $C \subseteq Q_{safe}$ such that any trajectory that starts from an arbitrary $q \in C$ is guaranteed to indefinitely remain in $C$ as long as the control input $u_e$ is chosen from the set of admissible inputs, i.e., $u_e \in S_J(q)$. FIG. 1 shows a guardian architecture proposed to solve Problem 1 described below.

Problem 1 can be solved using existing methods such as Ref. (15). However, as previously mentioned, uncertainty in the external input $u_o$ is larger from the perspective of the ego agent since the intention of other agents is unbeknownst to the ego agent a priori. As a result, the supervisor $S_J$ must be designed so that it would guarantee safety for any intention model, which is conservative and not desirable. In reality, the ego agent could observe the other agents and decrease the uncertainty by invalidating intention models that are not consistent with the observed external inputs. Inspired by this observation, we propose a less conservative guardian architecture, which is illustrated in FIG. 1, to solve Problem 1, that consists of a library of supervisor modules and an intention estimation module:

Definition 2. An intention estimation module $$\varepsilon: (Q \times U_e)^* \mapsto P_{\geq 1}(J).$$

maps any state-ego input trajectory $qu_e^t = \{(q^0, u_e^0), \ldots, (q^t, u_e^t)\}$, to a non-empty subset $J_v^{t+1} = \varepsilon(qu_e^t) \subseteq J$ of valid intentions such that there exist an external control input $u_o^k$ and disturbance $w^k$ that satisfy the following for all $k = \{0, \ldots, t\}$:

$$q^{k+1} = f(q^k, [u_e^k u_o^k], w^k), \text{ and } u_o^k \in I_i(q^k) \text{ for all } I_i \in J_v \quad (8)$$

An estimation module indicates the set of intention models that are valid by invalidating the intentions that are inconsistent with a given state-input pair. Since the true intention $I_{i*}$ of the other agents is assumed to be constant over time, it is always included in the set of valid intentions, i.e., $I_{i*} \in \varepsilon(qu_e)$, $\forall qu_e \in (Q \times U_e)^*$. Since lengthening the state-input pair can only refine the set of valid intentions, intention estimation over time is a monotonically non-increasing set for a system.

Given an instance of Problem 1, a more permissive supervisor can be designed by leveraging the information gained from such an intention estimation module. To do so, we compute a library of supervisors $\{S_J, S_{I_1}, S_{I_2}, \ldots, S_{I_n}\}$. A more permissive design can be achieved if we compute a supervisor for each subset of intentions, i.e., compute $S_{J_v}$ for each $J_v \in P_{\geq 1}(J)$. However, such an approach would be computationally more expensive as a trade-off. As the notation indicates, we design a supervisor $S_{I_i}$ for each possible intention model $J_i$, together with an intention-agnostic supervisor $S_J$. During run-time, we switch between the supervisors, depending on the output of the intention estimation module $\varepsilon$. This approach enables us to change the level of permissiveness depending on the observations, while still guaranteeing safety. That is, we use the supervisor module $S_J$ when the true intention of the other agents is not yet known, and guarantee that the system remains in the safe set. Once the true intention $I_{i*}$ is revealed by the estimation module $\varepsilon$, we switch to the corresponding supervisor $S_{I_{i*}}$ that is more permissive. As a result, the overall architecture is less conservative.

The Scenario and System Models

Figure 2:
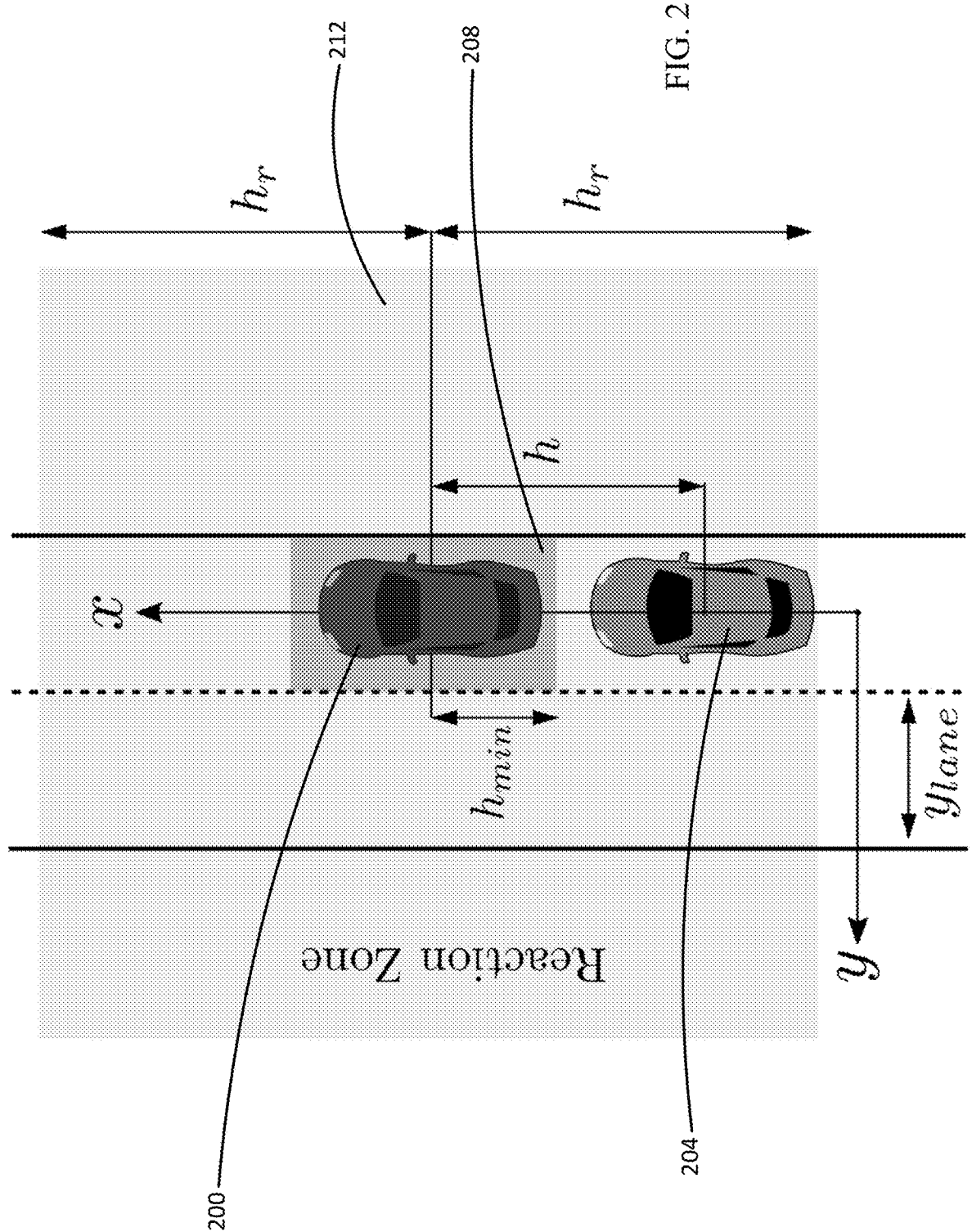
FIG. 2 shows an unsafe zone and reaction zone of an ego vehicle and a lead vehicle.

To illustrate the concepts that are presented in this disclosure, we choose a simple autonomous driving scenario and explain the solution method referring to this scenario. However, the concepts we propose in this disclosure apply to the general framework explained in the Problem Statement and Architecture section above. Imagine two vehicles moving on a straight road with two lanes as illustrated in FIG. 2. One of these vehicles, the ego vehicle, is controllable through $u_e$ and can move both in lateral and longitudinal directions. The other vehicle is called the lead vehicle and its longitudinal motion is controlled by a fixed intention model chosen from a set of intention models. Intention models are assumed to react to the ego vehicle when the distance between the cars is less than some threshold. As stated earlier, while this set of intention models is known to the ego vehicle, the specific intention model that controls the lead vehicle is not. We assume that the lead vehicle has no lateral motion and always drives along the center of the right lane. The safety requirement for the ego vehicle is to keep a minimum safe distance between the vehicles, in both the longitudinal and the lateral directions. The lead vehicle does not need to be in front of the ego vehicle as long as the lead vehicle is traveling along the same roadway in a general direction similar to the ego vehicle.

We now provide dynamics that captures the aforementioned scenario and formally define the safety requirements.

Dynamics

The vehicles are treated as point masses, and their motion is modeled as follows:

$$v_{e,x}^T = v_{e,x} + (a_{e,x} - b_e v_{e,x})\Delta t + w_{e,x}\Delta t, \quad y_e^T = y_e + v_{e,y}\Delta t + w_{e,y}\Delta t, \quad v_{L,x}^T = v_{L,x} + (a_{L,x} - b_L v_{L,x})\Delta t + w_{L,x}\Delta t \quad (9)$$

where $\Delta t$ (=0.1) is the sampling time, $v_{e,x}$ is the longitudinal velocity of the ego vehicle, $y_e$ is the lateral displacement of the ego vehicle with respect to the center of the right lane, and $v_{L,x}$ represents the longitudinal velocity of the lead vehicle. The ego vehicle is controlled through its longitudinal acceleration $a_{e,x}$ and lateral velocity $v_{e,y}$. The longitudinal acceleration of the lead vehicle, $a_{L,x}$, depends on the intention and is treated as external disturbance. Terms $b_e$ (=0.1) and $b_L$ (=0.1) are drag coefficients and $w_{e,x}(k) \in [-0.15, 0.15]$, $w_{e,y}(k) \in [-0.09, 0.09]$ and $w_{L,x}(k) \in [-0.05, 0.05]$ are process noises. The relative longitudinal distance between the two vehicles is denoted by h and evolves according to the following:

$$h^+ = h + (v_{L,x} - v_{e,x})\Delta t. \quad (10)$$

As indicated by (10), positive values for h implies that the ego vehicle is behind the lead vehicle.

We now define the vectors $q=[v_{e,x}, v_{e,y}]^T$, $u_o=[a_{L,x}]$, $u=[u_e, u_o]^T$, $w=[w_\Delta, w_{e,x}, w_{L,x}]^T$, and combine (9) and (10) in to the form (1), where $Q = [v_{e,x}^{min}, v_{e,x}^{max}] \times [y_e^{min}, y_e^{max}] \times \mathbb{R} \times [v_{L,x}^{min}, v_{L,x}^{max}]$.

Intention Models

We consider two driver intentions, denoted by $\mathcal{I} \in \{I_a, I_c\}$, corresponding to Annoying and Cautious drivers. These drivers react to the ego vehicle only when it is close enough, that is, when the absolute value of the longitudinal distance is less than some threshold. This area is called the reaction zone and is illustrated in FIG. 2. When the ego vehicle is inside the reaction zone, the external input $u_o$ is determined by an affine state-feedback policy. In addition to the acceleration bounds captured by $\mathcal{U}_o$, we assume the lead car velocity is bounded by $v_{L,x} \in [v_{L,x}^{min}, v_{L,x}^{max}]$. One thing to note is that an affine state-feedback might lead to violation of the assumed acceleration and velocity bounds. These bounds mimic the physical limitations of the vehicles, thus, it is assumed not possible to exceed them. Thus, external input $u_o$ is saturated when needed. The parameter values used in our experiments for these models are: $a_{L,x}^{max} = -a_{L,x}^{min} = 3$ m/s², $w_\Delta^{max} = -w_\Delta^{min} = 0.1$, $v_{L,x}^{min} = 0$, $v_{L,x}^{max} = 33.5$ m/s, $K_{des} = 1$, $K_a = [1, 0, 0, -1]$, $K_c = [0, -0.1, 0.1, -0.01]$, $k_c = 0.01$, $v_{L,x}^{des} = 30$ m/s, $h_r = 60$ m, $h_{min} = 10$ m, $v_{e,x}^{min} = 16$ m/s, $v_{e,x}^{max} = 36$ m/s, $y_e^{min} = -0.9$ m, $y_e^{max} = 2.7$ m. The resulting dynamics for each intention model can be represented as a PWA system as shown below.

FIG. 2 shows a red car 200 to indicate the lead vehicle, and a blue car 204 to indicate the ego vehicle. A red box 208 indicates an unsafe zone, while a blue box 212 indicates the reaction zone. The reaction zone can include areas in front of, behind, and to the sides of the ego vehicle. Specifically, the ego vehicle can be in front of the lead vehicle and still be in the reaction zone.

Annoying Driver $I_a$: tries to match the speed of the ego vehicle when the ego vehicle is inside the reaction zone, thus making it harder to overtake:

$$a_{L,x} = \begin{cases} \max(\min(K_a q, \alpha_1), \alpha_2) + w_\Delta & \text{if } |h| \leq h_r \\ \max(\min(v_{L,x}^{des} - v_{L,x}), \alpha_1), \alpha_2) + w_\Delta & \text{o.w.} \end{cases} \quad (11)$$

where $$\alpha_1 = \min(a_{L,x}^{max}, \frac{d_{L,x}^{max} - (1 - b_L \Delta t) v_{L,x}}{\Delta t} - w_\Delta^{max}) \quad (12)$$

$$\alpha_1 = \max(a_{L,x}^{min}, \frac{d_{L,x}^{min} - (1 - b_L \Delta t) v_{L,x}}{\Delta t} - w_\Delta^{min})$$

The min and max operations in (11) and (12) ensure that the acceleration and velocity bounds for the lead vehicle are always respected. Note that action of the annoying driver is non-deterministic due to the term $w_\Delta \in [w_\Delta^{min}, w_\Delta^{max}]$, which captures the variability within each intention model. Due to min and max operators used, resulting dynamics $f_a = \{(f_a^j, D_a^j)\}_{j=1}^9$ is a PWA system with nine regions.

Cautious Driver $I_c$: tends to maintain its desired speed and makes it easier for ego vehicle to change lane or overtake.

The cautious driver is modeled as follows:

$$a_{L,x} = \begin{cases} \max(\min(K_c q + k_c v_{L,x}^{des}, \alpha_1), \alpha_2) + w_\Delta & \text{if } |h| \leq h_r \\ \max(\min(v_{L,x}^{des} - v_{L,x}), \alpha_1), \alpha_2) + w_\Delta & \text{o.w.} \end{cases} \quad (13)$$

where $\alpha_1$ and $\alpha_2$ is defined as in (12). The resulting dynamics $f_c = \{(f_c^j, D_c^j)\}_{j=1}^9$ is a PWA system with nine regions.

Bounded Velocity $I_{bnd}$: When the intention of the lead vehicle is not known, we assume the worst case scenario and let $v_{L,x}$ to change arbitrarily fast. That is, $v_{L,x}^T$ can take any value between the lower and the upper bound, regardless of $v_{L,x}$. By doing so, we capture the behavior of both intentions. In some embodiments, the bounded velocity intention model $I_{bnd}$ can capture the behavior of any number of other intention models. We use this conservative model $I_{bnd}$ when the intention of the lead vehicle is not known.

Safety Requirements

The ego vehicle is required to keep a minimum distance between two vehicles at all times. In this case, we can represent the set $Q_{safe}$ of safe states as follows:

$$Q_{safe} = Q_{safe}^1 \cap Q_{safe}^2 \cap Q_{safe}^3, \quad (14)$$

where $Q_{safe}^1 = \{q, \in Q \mid |h| \geq h_{min} \text{ or } y_e \geq |y_e^{min}|\}$ capturing safe distance during takeover, $Q_{safe}^2 = \{q \in Q \mid y_e \in [y_e^{min}, y_e^{max}]\}$ capturing lane keeping constraints, and $Q_{safe}^3 = \{q \in Q \mid v_{e,x} \in [v_{e,x}^{min}, v_{e,x}^{max}]\}$ capturing the speed limits. Note that, the resulting set $Q_{safe}$ of safe states is not convex, but it can be represented as a union of polyhedral.

The Guardian For The Overtake Scenario

The three parts of a solution to Problem 1 are presented in this section. They are (i) a library of RC IS that are defined for each intention, (ii) an intention estimation module and (iii) an intention-aware supervisor module. The design of the library of supervisor modules will be the main focus of this section. With that in mind, we explain the methods for invariant set construction and intention estimation before these three components are synthesized. After that, we show how the intention estimation problem can be solved. Finally, we prove that the proposed method provides safety and is less conservative than models.

Library of RCIS

An RCIS can be constructed using any of the methods described in the Invariant Set Computation section above. Specifically, we leverage the inside-out algorithm of Ref. (15) to compute an RCIS for each intention model $I_j \in \mathcal{I}$. The reader can recall that the inside-out algorithm uses an initial RCIS and expands it to obtain a final RCIS. One fact that we can use to generate such an initial, simple RCIS is given as follows:

Proposition 1: The set $C_{left} = \{q \in Q \mid y_e \in [0.9, 2.7]\}$ of states corresponding to the left lane is an RCIS for any intention. The proposition is stated without proof because the lead car cannot move laterally (i.e., it cannot change its y position in the lane); thus, the proposition immediately follows from the model definition. Given this proposition, one can apply the inside-out algorithm by setting the 'left lane' states as the initial RCIS, i.e., $C_o = C_{left}$, for any of the intention models discussed in the Intention Models section above. A more involved, but helpful result that can be used to ease computation is:

Proposition 2. Any set $C_{bnd} \subseteq Q_{safe}$ that is a controlled invariant set for the bounded velocity model is also a controlled invariant set for the Annoying and the cautious driver intention models.

Proof: While the acceleration of the lead vehicle $a_{L,x}$ is assumed to be bounded for the annoying and the cautious driver intention models, bounded velocity model lets the lead vehicle to change its velocity arbitrarily fast. Thus, if it is possible to remain robustly safe in the bounded velocity model, then when the lead car's acceleration is more restricted than the bounded velocity model allows, it should be the case that the ego vehicle can remain safe in all states in $C_{bnd}$.

Thus, the previous two propositions can be used to synthesize a set of RCIS $\{C_1, \ldots, C_N\}$, corresponding to each of the intention models described in the Intention Models section above. The bounded velocity model, annoying intention model, and caution intention model can correspond to $C_{bnd}$, $C_a$, and $C_c$ respectively. Specifically, one can use Proposition 1 to identify the left lane as the initial RCIS, i.e., set $C_0 = C_{left}$; and apply the inside-out algorithm for the bounded velocity model to obtain $C_{bnd}$. After that, the resulting set $C_{bnd}$ can be used as the initial RCIS for the inside-out algorithm according to Proposition 2, for each of the two intentions. Each of these RCISs induces a supervisor. For instance, for i∈{a, c}, we have $S_{J_i}(q) = \{u_e \in U_e | f_i(q, u, w) \in C_i, \forall w \in W, \forall u_o \in I_i(q)\}$. And, $S_J$ is defined similarly from $C_{bnd}$. Moreover, these supervisors by construction satisfy the following:

Proposition 3: $S_J \subseteq S_{J_a}$ and $S_J \subseteq S_{J_c}$.

Intention Estimation

Intention estimation techniques can roughly be categorized into two categories: active methods [see Ref. (7), Ref. (9)] and passive methods [see Ref. (12), Ref. (14)]. The former assumes that the intention estimation method can modify the controller's commands. The latter, on the other hand, assumes that the intention estimation module cannot modify control signals and must perform the discrimination operation using the observations gathered by the sensors. Our guardian architecture uses a passive intention estimation scheme to allow maximal permissiveness and to avoid violation of any safe input constraints.

Given a state-input trajectory $qu_e^t = \{(q^0, u_e^0), \ldots, (q^m, u_e^t)\}$ and two intention models $J = \{I_a, I_c\}$ as in the Intention Models section above, intention estimation aims to determine whether or not the state-input trajectory is consistent with model i∈{a, c}. This problem can be posed as a linear program at each time t, similar to Ref. (10):

find $\{u_o^k, w^k\}_{k=max(t-N, 0)}^{t-1}$
s. t. for all k∈{max(t−N, 0), . . . , t−1}
$q^{k+1} = f_i^j(q^k, u^k, w^k)$ if $q^k \in D_i^j$,
$u_o^k \in I_i(q^k)$ and $w^k \in W$ where N is a horizon to keep the estimator of finite memory. Note that the infeasibility of $LP_i^t$ implies that the intention model is not $I_i$. Therefore, the estimator ε is defined as:

$$\varepsilon(qu_e^t) = \begin{cases} I_a & \text{if } \varepsilon(qu_e^{t-1}) = I_a \text{ or } LP_c^t \text{ is infeasible} \\ I_c & \text{if } \varepsilon(qu_e^{t-1}) = I_c \text{ or } LP_a^t \text{ is infeasible} \\ J & \text{otherwise} \end{cases} \quad (15)$$

Putting Things Together

Having designed a library of RCIS and the intention estimation module, at run-time, we initialize the estimated intention for the intention-aware supervisor as the bounded velocity model, i.e., $J_v^0 = J$. As the intention estimation model ε refines the valid intention models $J_v$ by collecting data, the intention-aware supervisor is updated accordingly.

Theorem 1. Assume that the intention of the other vehicle is not changing with time (i.e., $I_{i*}$ is constant for the driving scenario) and $I_{i*} \in J = \{I_a, I_c\}$. If $q^0 \in C_{bnd}$ and for all t, $u_e^t \in S_{J_v^t}(q^t)$ where $J_v^t = \varepsilon(qu_e^{t-1})$, then we have $q^t \in Q_{safe}$ for all t.

Proof: First note that the linear program ($LP_i^t$) will always be feasible for i=i* as we assume $I_{i*}$ is constant over time. Therefore, $I_{i*} \in J_v^t$ for all t. The intention estimation is initialized with $J$. By construction, $S_J(q^0) \neq \emptyset$ for all q∈$C_{bnd}$. Now, assume that the intention estimation module never detects the correct intention (i.e., $J_v^t = J$ for all t). Since $S_J(q^0) \neq \emptyset$, it follows from Def. 1 by induction that $S_{J_v^t}(q^t) \neq \emptyset$ and $q^t \in C_{bnd} \subseteq Q_{safe}$ for all t. Now, assume that intention estimation module eventually reveals the true intention $I_{i*}$, i.e., there exists a t* such that $J_v^{t*} = I_{i*}$. We know that the state of the system is safe ($q^t \in C_{bnd} \subseteq Q_{safe}$) for t<t* by using $S_J$. Moreover, by Proposition 3, at time t*, $S_{J_{i*}}(q^{t*}) \supseteq S_J(q^{t*}) \neq \emptyset$ and $q^{t*} \in C_{bnd} \subseteq C_{i*}$. By Eq. (15) and the assumption on constant intention, we will have $J_v^t = I_{i*}$ for all t≥t*. Now, again, it follows from Def. 1 by induction that $S_{J_v^t}(q^t) \neq \emptyset$ and $q^t \in C_{i*} \subseteq Q_{safe}$ for all t≥t*.

Results

In this section, we discuss the results of the proposed solution to Problem 1 for the driving scenario presented in the Scenario And System Models section above. We briefly describe the tools and methods used to implement the invariant set algorithms such as the inside-out algorithm. We then illustrate the intuitive conclusions that can be made about the RCIS and safe input sets of various estimated intentions.

Implementation and Experimental Setup

Figures 3A, 3B:
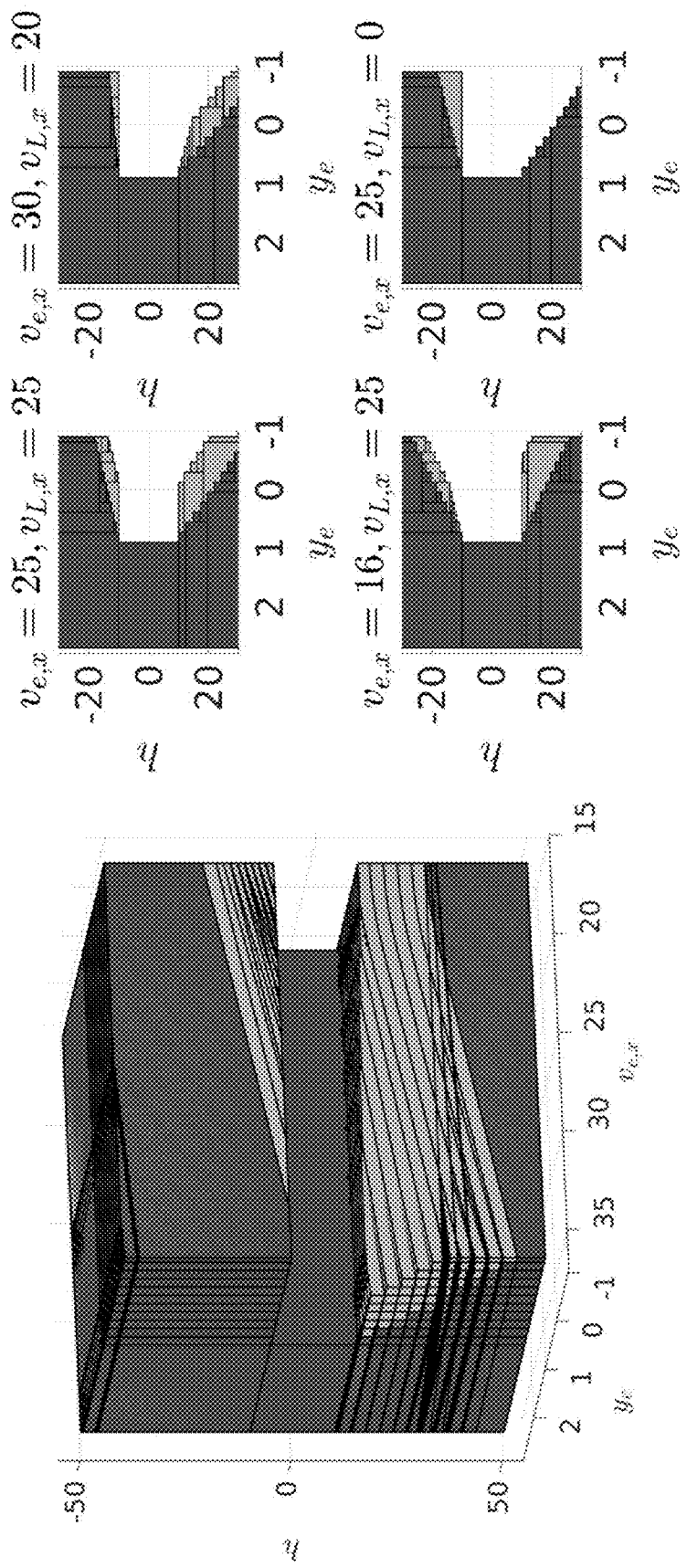
FIG. 3A shows invariant sets for a bounded velocity model and a cautious driver intention model.
FIG. 3B shows an additional view of the invariant sets of FIG. 3A.

We use the inside-out method described in the Invariant Set Computation section above to compute RCIS and safe input sets. We use polyhedra (or union of polyhedra) representation of sets in our algorithm, since it forms a closed class of objects under set operations such as intersection and projection. The code is implemented on top of the Multi-Parametric Toolbox 3.0 (MPT3) Ref. (11), a MATLAB toolbox with efficient implementations of polyhedra manipulations. FIG. 3 shows the invariant sets for the bounded velocity model (red) and the model of the cautious driver intention (red+blue, the result in 5 iterations). FIG. 3(a) shows the projection of the invariant set of ($v_{e,x}$, $y_e$, h) space, while FIG. 3(b) shows sliced invariant sets given the $v_{e,x}$ and $v_{L,x}$ in m/s. The system dynamics, intention models and the safety requirements are as stated in the Scenario And System Models section above.

RCIS Computation Results and Discussion

We first compute an RCIS for the bounded velocity model. The seed set for the inside-out algorithm is chosen as the left lane, i.e., $C_0 = C_{left}$, which is shown to be robust controlled invariant in Proposition 1. The algorithm converges in 12 iterations and the resulting RCIS is shown as the red regions in FIGS. 3a and 3b.

Due to the Proposition 2, RCIS for the bounded velocity model is also robust controlled invariant for the other intentions. Thus, we initialize the inside-out algorithm with this new seed in the following computations. The resulting set after 5 iterations for the cautious driver intention model is shown as the union of the red and blue regions in FIGS. 3A and 3B. The blue region indicates the difference between the RCIS of the cautious driver and the bounded velocity model. The results show that by estimating the intention model, we indeed have a larger invariant set. On the other hand, RCIS obtained for the annoying intention is almost visually indistinguishable with the invariant set for the cautious intention, but as can be shown in FIG. 4, their affordable inputs corresponding to the same state can be different.

Note that, as shown in FIG. 4, the safe input set can be non-convex.

Figures 4A, 4B, 4C:
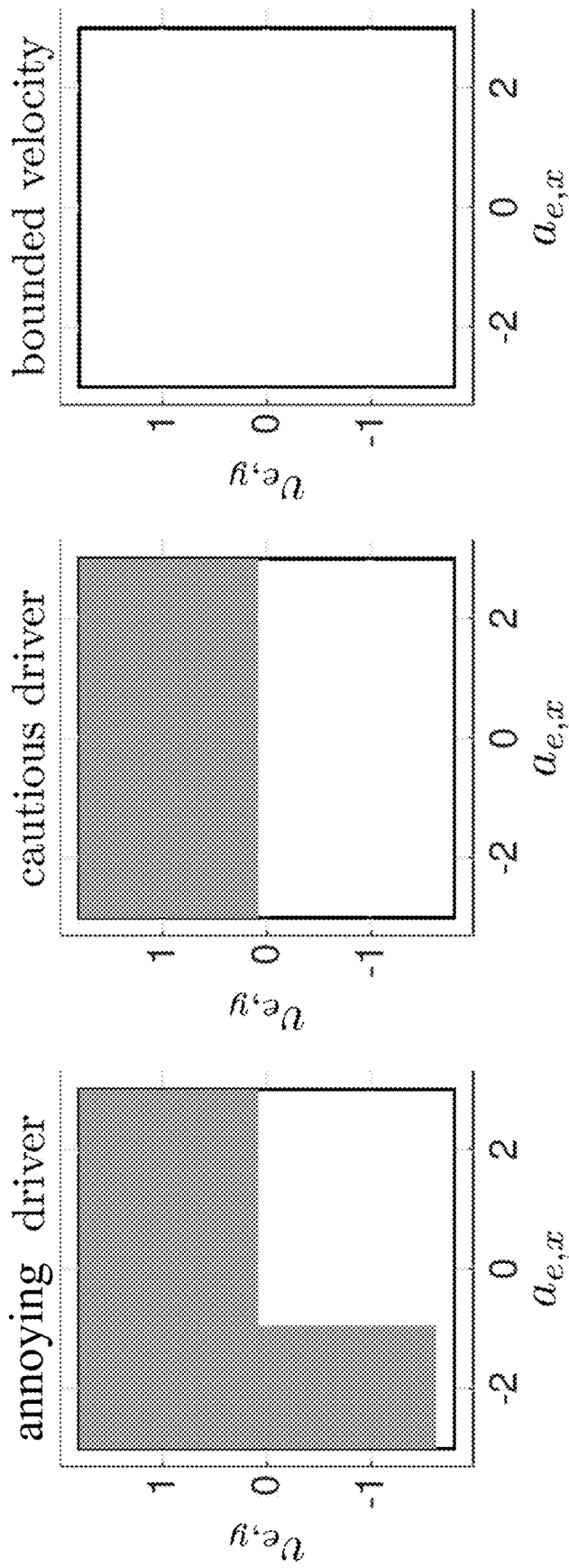
FIG. 4A shows permissible inputs for an annoying intention model.
FIG. 4B shows permissible inputs for a cautious intention model.
FIG. 4C shows permissible inputs for a bounded velocity intention model.

In that case, the projection to each dimension can be done in an order, according to a user defined priority. For example, speed change can be perceived less "invasive" compared to a steering change from the human user perspective. Then, projection on the throttle space might be preferred to the projection on the steering space. FIG. 4A shows the safe inputs (blue regions) at state $[25, -0.297, 16.52, 20]^T$ for annoying driver intention, while FIG. 4B shows the safe inputs for the same state for a cautious driver intention, and FIG. 4C shows the safe inputs for the same state for a bounded velocity model.

Overtaking Simulation

We perform an overtaking simulation in MATLAB to show how the ego car and the lead car behave with and without the supervisor, with a baseline switched model predictive control (MPC) controller for the ego car that is chosen to mimic a human driver that undertakes the overtaking task. In the supervised case, the supervisor is implemented using the controlled invariant sets obtained by our proposed algorithm. On the other hand, the lead car behaves according to one of the two intentions.

Figure 5A:
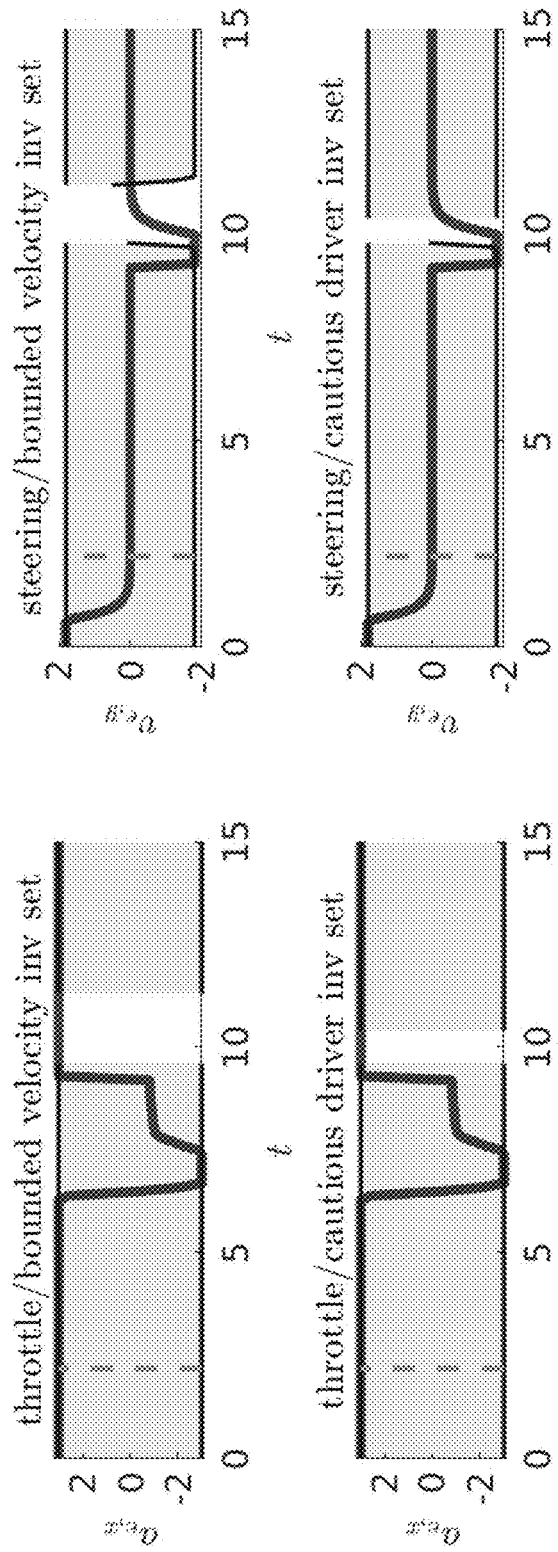
FIG. 5A shows graphs of control inputs for a controller without supervisor for various intentions and overriding preferences.
Figure 5B:
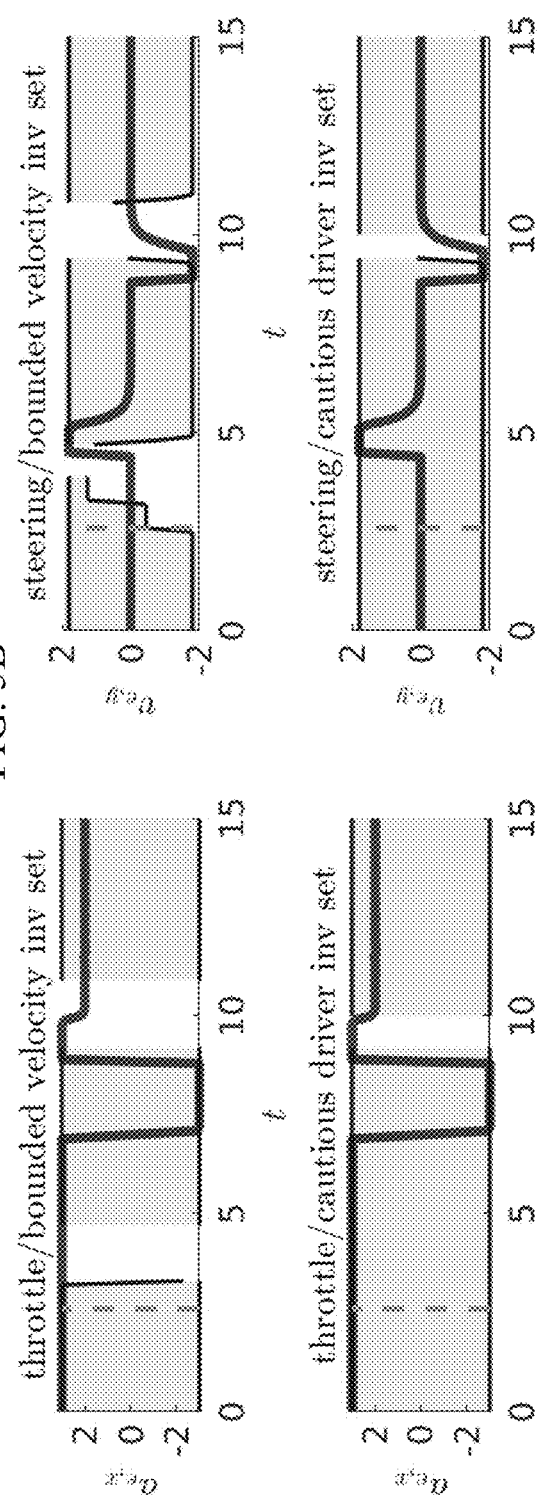
FIG. 5B shows additional graphs of control inputs for a controller without supervisor for various intentions and overriding preferences.

FIGS. 5A, 5B show the MPC control inputs over time in the simulations with no supervision for the case where the lead car driver is cautious for two overtaking scenarios. The first scenario is to take over the lead car directly and the second one is to tailgate the lead car for several seconds and then try to take over. The red lines shows the MPC inputs and the blue shadow shows the safe range of throttle/steering inputs (by slicing the safe input set at each time) given the user-selected steering/throttle inputs. The region without blue shadow corresponds to the time when the ego car is out of the invariant set, since no supervision is applied. In FIGS. 5A and 5B, the blue shadow in the second row covers more time steps than the first row, which implies that the invariant set for the cautious driver intention contains more states than the invariant set for the bounded velocity model, which in turn shows that once the intention estimation is done, the supervisor will behave less conservatively (i.e., will allow more user-selected inputs) by switching to the supervisor for the estimated intention. This is indeed the case, as can be seen in FIG. 5C for the second scenario, where the intention estimation and the guardian/supervisor are engaged.

The control inputs (red lines) of the ego vehicle over time for two scenarios with and without supervision: (1) ego car takes over directly (2) ego car tailgates for a few seconds and then takes over. The ego car in FIGS. 5A, 5B, and 5C is controlled by an MPC controller, but in FIG. 5D is controlled by a human driver using the vehicle simulator in FIG. 6. The lead car has cautious intention. The blue lines and shadow label the range of safe inputs given by the invariant sets. The green dash line labels the time that the intention estimation gives the correct intention. The green line in FIG. 5C labels the time that the ego car's inputs are overridden by the supervisor. The safe input ranges in the first and second rows in FIGS. 5A, 5B, 5D are computed with respect to the bounded velocity model and the cautious driver intention model respectively.

Figure 5C:
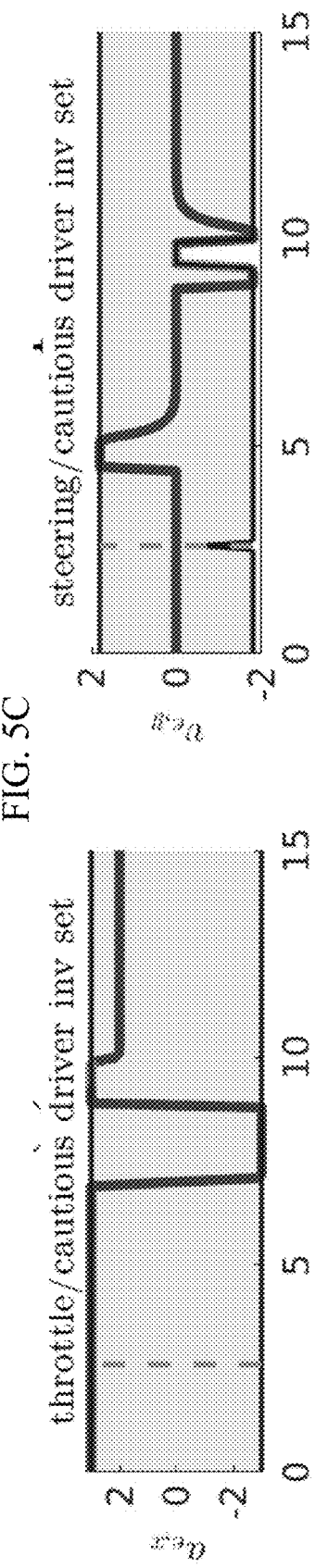
FIG. 5C shows graphs of control inputs for a controller with supervisor for various intentions and overriding preferences.
Figure 5D:
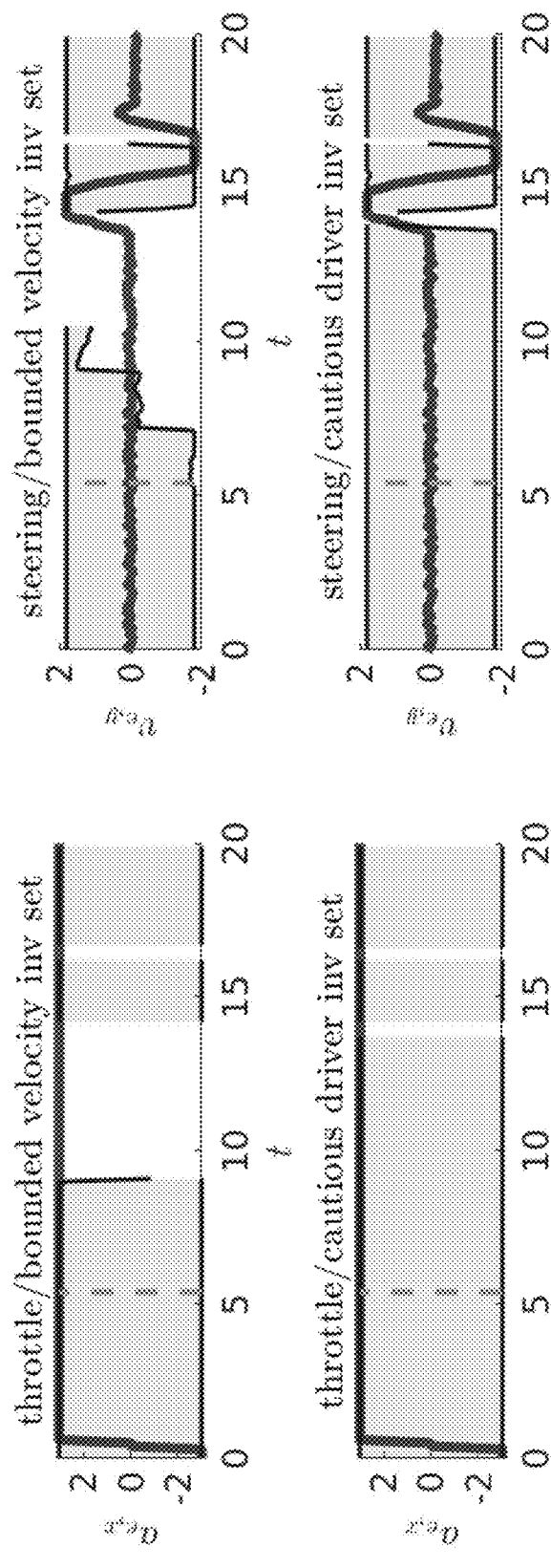
FIG. 5D shows graphs of control inputs from a human driver without supervisor for various intentions and overriding preferences.

In a set of simulation videos that we prepared, Simulation 1 shows an animation that compares the results in FIGS. 5B and 5C. The same scenario with the annoying intention is shown in a Simulation 2. In addition, in the videos of Simulations 3 and 4, we tuned the MPC parameters to mimic a safe driver and a "bad" driver (more likely to crash with the lead car), respectively. In the Simulation 3, the supervisor helps the ego car of bad driver to avoid a crash with the lead car, which happens to the other ego car without the supervisor in the simulation. Furthermore, experimental results in the Simulation 4 suggest that if the driver is already very cautious, such as keeping a safety distance with the lead car, the supervisor rarely needs to override.

Results From Driving Simulator

Figure 6A:
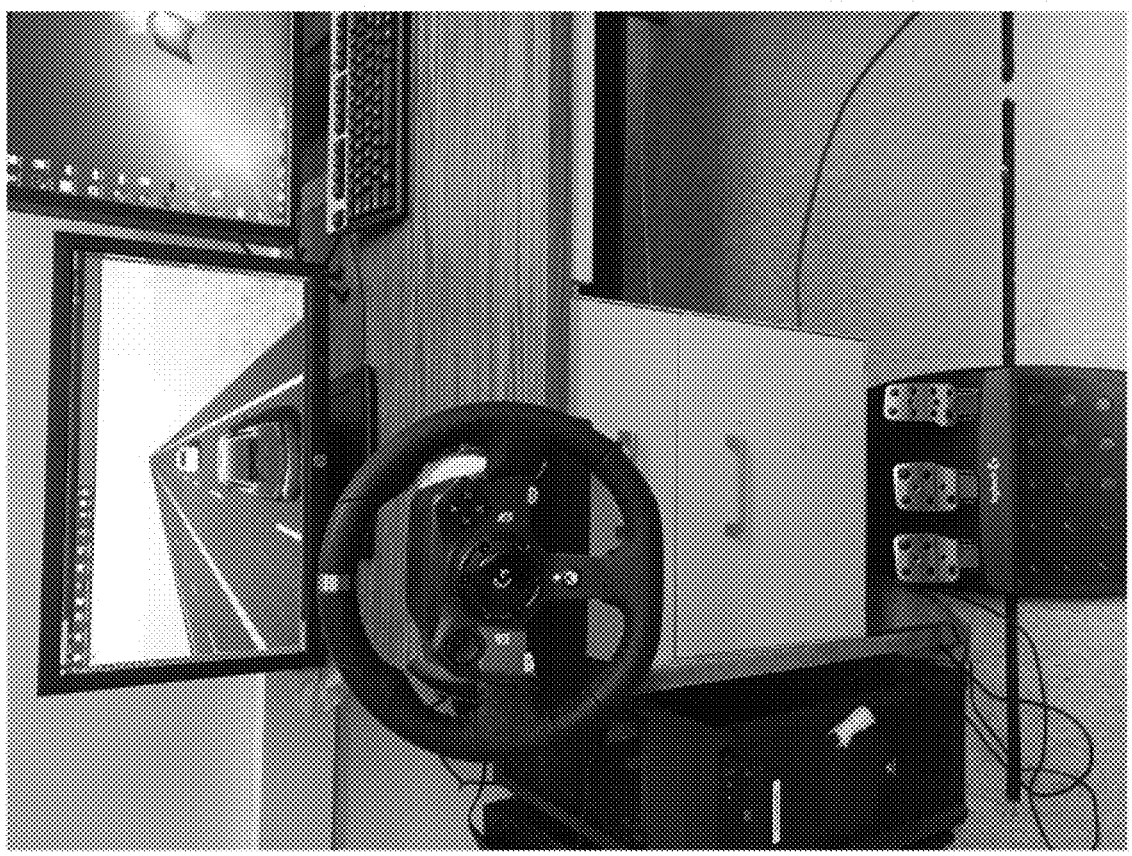
FIG. 6A shows a photo of a simulator setup.
Figure 6B:
FIG. 6B shows a chase camera view from the simulator setup of FIG. 6A.
Figure 6C:
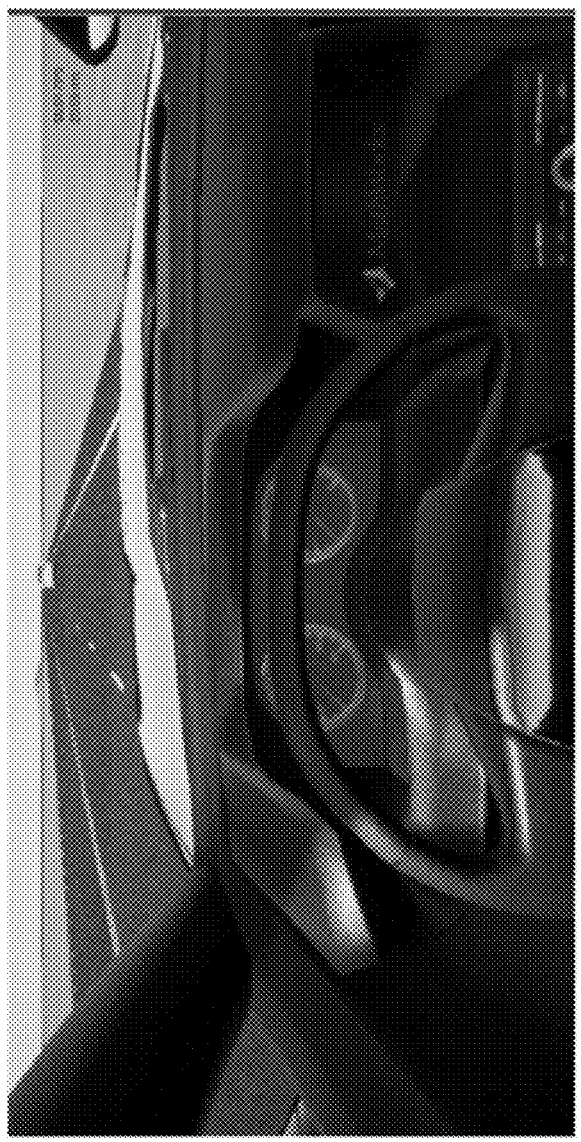
FIG. 6C shows an onboard camera view from the simulator environment.

We also collected data using a driving simulator, where a human-driver is asked to perform an overtake maneuver as described in the previous subsection. The dynamics are implemented in MATLAB/Simulink which interfaces with Unreal Engine 4 for visualization. The hardware used is a Logitech Driving Force G920 Racing Wheel for human control inputs (steering and acceleration). FIG. 6(a) shows the setup of the simulator. FIG. 6(b) shows a chase camera view from the simulator environment. FIG. 6(c) shows an onboard camera view from the simulator environment. FIG. 5(d) shows the data from human-driver overlaid with the guardian's assessment of its safety. As can be seen in the figure, again, revealing the intention significantly reduces the times human input needs to be overridden to guarantee safety.

In this disclosure, we propose a guardian architecture that combines a library of RCIS-based supervisors with online intention estimation to decide on a set of safe inputs. The supervisor then compares these inputs with the driver inputs of a guardian-equipped car, and modifies driver's inputs as needed. Our results show that intention estimation enables more permissive driving that interferes with human inputs less frequently. The results are demonstrated via simulation data and data collected from a human-driver on a driving simulator.

Example

This Example is provided in order to demonstrate and further illustrate certain embodiments and aspects of the present invention and is not to be construed as limiting the scope of the invention.

Figure 7:
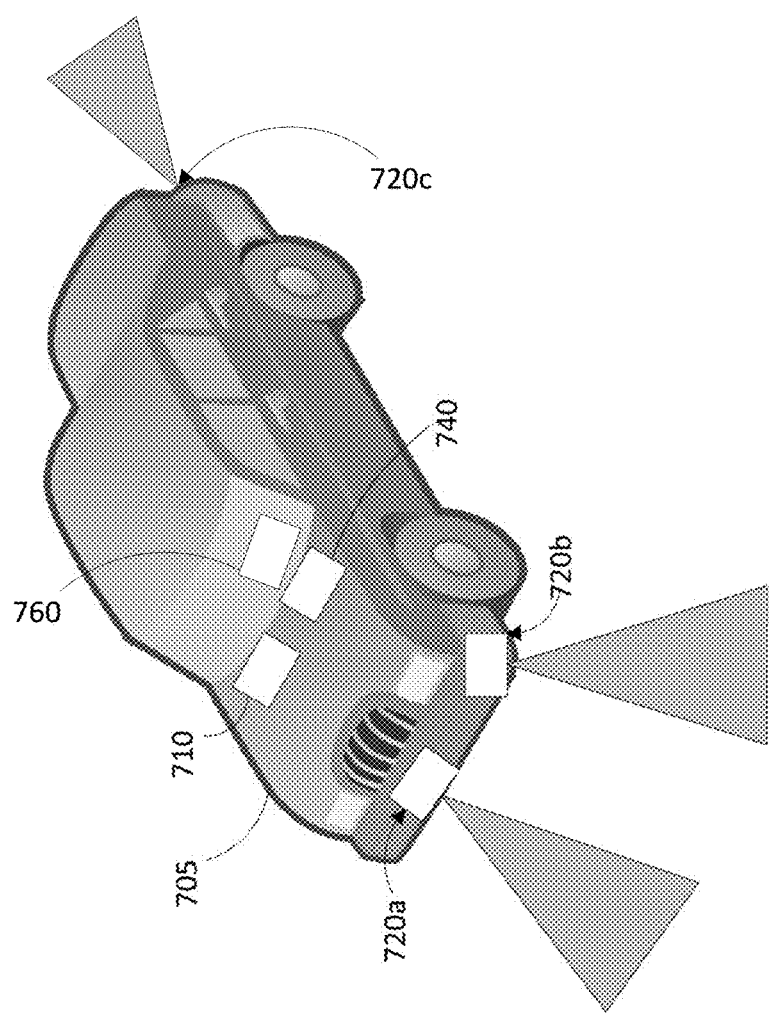
FIG. 7 shows an exemplary embodiment of an overtaking with an intention estimation system.
Figure 7:
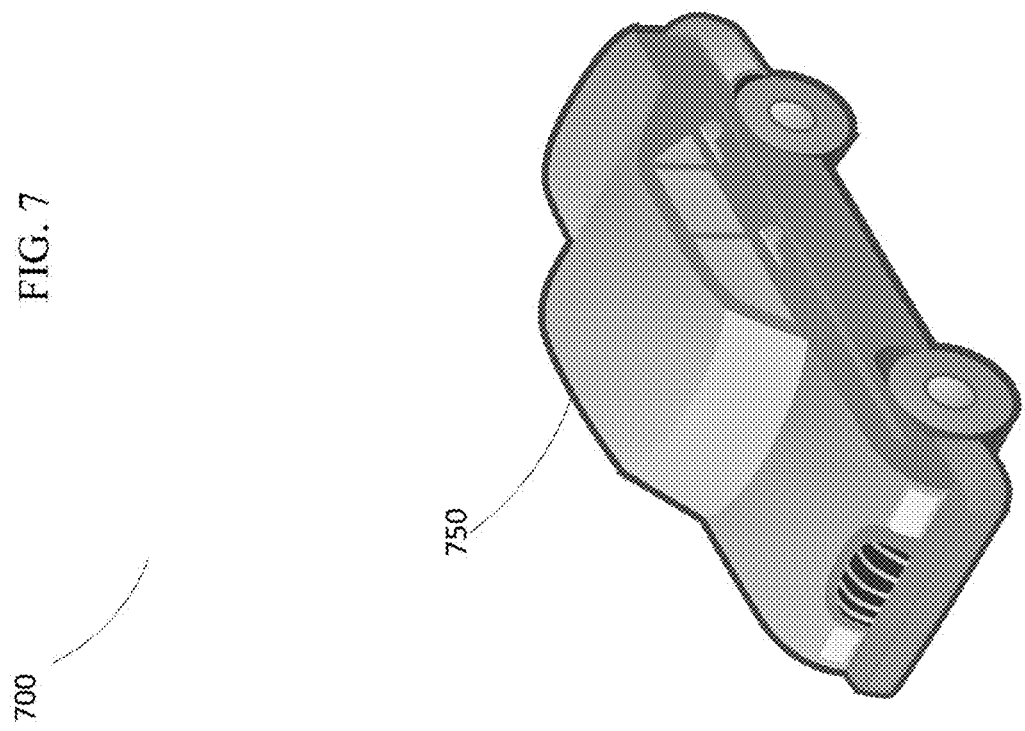

Referring now to FIG. 7, an exemplary embodiment of a driving control system 700 is shown. The system includes a plurality of sensors are coupled to the ego vehicle 705. The sensors can sense information associated with the ego vehicle 705, and/or a lead vehicle 750. The lead vehicle 750 may be traveling on a roadway in the same direction and lane as the ego vehicle 705. The plurality of sensors can include a first sensor 710 that can be a speedometer, a global positioning system sensor, or other applicable sensor configured to sense a speed and/or velocity of the ego vehicle 705.

The first sensor can be coupled to a controller 740 having a memory and a processor and coupled to the ego vehicle 705. The controller 740 can have an overtaking with intention estimation algorithm stored in the memory, which will be explained in detail in FIG. 8. The controller 740 can be coupled to a vehicle control system (not shown) of the ego vehicle 705. In some embodiments, the controller 740 can be coupled to the vehicle control system via a Controller Area Network (CAN) bus. The vehicle control system can be an autonomous or semi-autonomous vehicle control system with any number of controllers, interfaces, actuators, and/or sensors capable of controlling a motor, engine, transmission, braking system, steering system, or other subsystem of the ego vehicle. The vehicle control system can be used to perform a vehicle maneuver such as overtaking a lead vehicle 750, changing the speed the ego vehicle 705 by controlling the braking and/or throttle of the ego vehicle 705, controlling the steering of the front and/or rear wheels of the ego vehicle 705, or controlling the movement (i.e. speed, acceleration, direction of travel, etc.) of the ego vehicle 705 via one or more subsystems of the ego vehicle 705. The vehicle control system can control components such as the motor, engine, transmission, braking system, steering system, or other subsystem, based on information received from sensors coupled to driver inputs devices such as a brake pedal, accelerator pedal, steering wheel, gear shifter, etc. in order to execute the vehicle maneuver. For example, the vehicle control system can control the motor or engine based on information received from a sensor coupled to the accelerator pedal. As will be described later, this disclosure provides a process for receiving driver input information from these sensors, determining if the driver input information is permissible, and, if permissible, providing the driver input information to the vehicle control system, and providing a replacement input to the vehicle control system if the driver input information is not permissible. The vehicle control system may execute the vehicle maneuver using replacement values for one subsystem, such as the steering system, while providing the driver input values to other subsystems, such as the motor and/or braking system, which may be perceived as less invasive by the driver. This vehicle maneuver may be referred to as "going straight." In some embodiments, the controller 740 may be a portion of the vehicle control system.

The plurality of sensors can include a second sensor 720 coupled to the controller 740 and configured to sense surroundings of the ego vehicle 705. The second sensor 720 can be a sensor such as a LiDAR sensor, a camera such as an infrared camera or visible light camera, an ultrasonic sensor, a radar sensor, or any other type of sensor capable of sensing the location, speed, and or velocity of objects around the ego vehicle 705. The second sensor 720 may sense information about a location, speed, or velocity of the lead vehicle 750. The information, either directly or indirectly, may be used by the controller 740 to calculate a location of the lead vehicle 750 relative to the ego vehicle 705, a headway distance between the lead vehicle 750 and the ego vehicle 705, a lateral velocity or acceleration of the lead vehicle 750, a longitudinal velocity or acceleration of the lead vehicle 750, a lateral location of the ego vehicle 705, and/or a lateral location of the lead vehicle 750. Lateral location can be the location of the vehicle within a lane or the location along the y direction shown in FIG. 2, while longitudinal location can be the location of the vehicle within a lane or the location along the x direction shown in FIG. 2. The second sensor 720 can be capable of sensing a speed or velocity of an object natively. Alternatively, the speed or velocity of the object can be calculated by the controller 740 information sensed by the sensor using methods known in the art, such as deriving a velocity of a vehicle from location information sensed by a LiDAR sensor.

The plurality of sensors can include at least one third sensor 760 that can be coupled to the controller 740 and configured to sense driver input data. The third sensor 760 can be coupled to an accelerator pedal, a brake pedal, a steering wheel, or any other driver control input. The third sensor 760 can be any applicable sensor type to measure a position of the driver input controls. For example, the third sensor 760 could be a potentiometer coupled to the accelerator pedal or brake pedal, or a rotary encoder coupled to the steering wheel. Any number of third sensors can be used to measure any number of driver inputs, for example the accelerator pedal can be coupled to an third sensor 760, the brake pedal can be coupled to another third sensor 760, and the steering wheel can be coupled to an additional third sensor 760.

Any number of first sensors 710, second sensors 720, and third sensors 760 can be coupled to the ego vehicle 705 in order to improve the speed, velocity, and/or object location sensing capabilities of the ego vehicle 705. For example, multiple second sensors 720a and 720b can be mounted to the front of the ego vehicle 705. At least one second sensor can be mounted to the rear of the ego vehicle 705, as indicated by second sensor 720c. Second sensor 720c can be used to sense the location of the lead vehicle 750 when the ego vehicle 705 is ahead of the lead vehicle 750, i.e. when the ego vehicle 705 is almost done overtaking the lead vehicle 750. The second sensors 720 may include different sensor types, i.e., some of the second sensors 720 are cameras while others are LiDAR sensors. The plurality of sensors can be divided up as a number of sub-pluralities of sensors, i.e., a first plurality of sensors, a second plurality of sensors, and a third plurality of sensors. Some of the sub-pluralities of sensors may share sensors or have a common sensor, i.e., a sensor may belong to the first plurality of sensors and the second plurality of sensors. In some embodiments, both the first plurality of sensors and the second plurality of sensors can include a speedometer. It is contemplated that a single sensor capable of sensing all of the parameters described above could be used in place of the first sensor 710 and second sensor 720. Additionally, multiple controllers 740 may be used in order to implement the driving control system 700.

Referring now to FIG. 7 as well as FIG. 8, an exemplary embodiment of process 800 for implementing a supervisory system for monitoring an overtaking of a lead vehicle by an ego vehicle is shown. Generally, the process 800 determines an intention of the lead vehicle, selects an RC IS corresponding to the intention, and monitors the control inputs of the ego vehicle in order to ensure the ego vehicle operates within the RCIS. The process 800 can be implemented as instructions on a memory of a computational device such as the controller 740.

At 804, the process 800 can initialize a supervisor to use a bounded velocity model $I_{bnd}$. The bounded velocity model $I_{bnd}$ can belong to a plurality of intention models including the bounded velocity model $I_{bnd}$, the annoying intention model $I_a$, and the cautious intention model $I_c$, or any other user-defined intention models as described above. Each intention model in the plurality of intention models can correspond to a different driving behavior, such as different rates of slowing down, different rates of speeding up, changing lanes, etc. Each of the intention models can have or include an associated RCIS, $C_i$, pre-calculated using the methods described in the "The Guardian for the Overtake Scenario" section of this disclosure. The bounded velocity model $I_{bnd}$ can be associated with $C_{bnd}$, the annoying intention model $I_a$ can be associated with $C_a$, and the cautious intention model $I_c$ can be associated with $C_c$. Each RCIS can be calculated using an associated dynamics model. Each dynamics model can include any equations or parameter values and/or ranges described in the "Dynamics" section above. The process can then proceed to 808.

At 808, the process 800 can receive lead vehicle information about a lead vehicle from a plurality of sensors coupled to the ego vehicle. The lead vehicle information can be used to directly or indirectly determine a velocity of the lead vehicle, a location of the lead vehicle relative to the ego vehicle, a headway separation distance between the lead vehicle and the ego vehicle, a lateral location of the ego vehicle, and/or a lateral location of the lead vehicle. The process 800 may continuously receive at least a portion of the lead vehicle information for at least a portion of the duration of the execution of the process 800. The process 800 can then proceed to 812

At 812, the process 800 can determine that the ego vehicle is within a threshold distance of the lead vehicle using the lead vehicle information. As described above, the lead vehicle information can be used to determine a location of the lead vehicle relative to the ego vehicle or a headway separation distance between the lead vehicle and the ego vehicle. The threshold distance may be a predefined headway distance between the front of the ego vehicle and the rear of the lead vehicle. In some embodiments, the process 800 can determine that the ego vehicle is within a reaction zone surrounding the lead vehicle using the location of the lead vehicle relative to the ego vehicle. The reaction zone can also include a predetermined area around the lead vehicle as described above and shown in FIG. 2. The process 800 can then proceed to 816.

At 816, the process 800 can receive ego vehicle information about the ego vehicle from the plurality of sensors coupled to an ego vehicle. The ego vehicle information can include a lateral velocity of the ego vehicle, a lateral acceleration of the ego vehicle, a lateral position of the ego vehicle relative to the lead vehicle, a longitudinal velocity of the ego vehicle, and/or a longitudinal acceleration of the ego vehicle. The process can receive ego vehicle information such as driver input data from the plurality of sensors coupled to the ego vehicle. The driver input data can include information indicative of a position of one or more driving input controls such an accelerator pedal, a brake pedal, and/or a steering wheel. The ego vehicle information can be used to directly or indirectly determine a ego vehicle input $u_e$, which may be controlled by a driver of the ego vehicle. The process 800 may continuously receive at least a portion of the ego vehicle information for at least a portion of the duration of the execution of the process 800. The process 800 can then proceed to 820.

At 820, the process 800 can infer an intention of the lead vehicle using the most recent lead vehicle data and the ego vehicle data, each of which can be received continuously. At least a portion of the lead vehicle data and/or the ego vehicle data can be used to calculate a state q and an ego vehicle input $u_e$ for one or more time points. The state q and the ego vehicle input $u_e$ can then be used to calculate a state-input trajectory $qu_e^t$. The process 800 can then infer an intention using equation (15) as described above to invalidate infeasible intention models. The inferred intention can be annoying, cautious, or any other user-defined intention, and can be associated with the non-invalidated intention model. The non-invalidated intention model can belong to the plurality of intention models. The process 800 may need to gather information over several time points before the intention is inferred. Before the intention is inferred, the process 800 can use the bounded velocity intention model $I_{bnd}$ as described above to keep the ego vehicle in a permissible operational state. The process 800 can then proceed to 824.

At 824, the process 800 can determine if the intention has been inferred. If the process 800 determines the intention has not been inferred (i.e., "NO" at 824), the process 800 can proceed to 832. If the process 800 determines that the intention has inferred (i.e., "YES" at 824), the process 800 can proceed to 828.

At 828, the process 800 can select an intention model from the plurality of intention models based on the inferred intention model. The process 800 can select the intention model corresponding to the inferred intention, i.e., select the annoying intention model $I_a$ if the inferred intention was cautious. The supervisor can then be set to use the intention model to calculate permissible driving inputs as will be explained below. The process can then proceed to 832.

At 832, the process 800 can calculate a set of permissible driving inputs using the intention model, and more specifically, the RCIS of the intention model. The process 800 can utilize at least a portion of the most recent lead vehicle data (which can be continuously received) and at least a portion of the most recent ego vehicle data (which can be continuously received) to calculate an updated state q for the latest discrete time point in which all information necessary to calculate the state q has been received. The updated state q can then be used to find the set of permissible driving inputs. The process 800 can then find all ego vehicle input $u_e$ at the location of the updated state q in the RCIS that will allow the trajectory of the ego vehicle to stay within the RCIS, i.e., are permissible driving inputs. Each ego vehicle input $u_e$ found is added to the set of permissible driving inputs. Each of the ego vehicle inputs (and thus each of the permissible driving inputs) can include a longitudinal acceleration value and a lateral velocity value that are paired with each other, i.e., a first longitudinal acceleration value is paired with a first lateral velocity value, a second longitudinal acceleration value is paired with a second lateral velocity value, etc. Each RCIS can have different ego vehicle inputs $u_e$ at the same state q because each RCIS is calculated with a different uncontrolled input w that is unique to each intention model. The process 800 can then proceed to 836.

At 836, the process 800 can calculate at least one driver input range based on the set of permissible driving inputs. The driver input range can be used to show a driver what driving inputs (e.g. acceleration inputs, braking inputs, steering inputs, etc.) they can provide to allow the trajectory of the ego vehicle to remain in the RCIS. As described above, each permissible driving input can include a longitudinal acceleration value and a lateral velocity value, which may not be intuitive for a human driver. Instead of showing the human driver a range of one or more longitudinal acceleration values of the permissible driving inputs, it may be more beneficial to convert the longitudinal acceleration values to a range of forward speeds, i.e., the type of speeds typically displayed on a speedometer inside the ego vehicle. The process 800 can calculate the range of forward speeds by multiplying the longitudinal acceleration values by the sampling time of the state q (i.e., how often the state q is updated) to get a range of speed adjustments, and add the speed adjustments to the current longitudinal velocity of the ego vehicle to get a range of permissible speeds. Instead of showing the human driver a range of one or more lateral velocity values of the permissible driving inputs, it may be more beneficial to convert the lateral velocity values to a range of steering wheel positions. The process 800 can calculate a steering wheel position for each of the lateral velocity values by taking the speed at the wheels of the ego vehicle and multiplying it by the cosine of the angle of the front wheels of the ego vehicle compared to a general forward orientation vector of the roadway, i.e., a vector along the length of the roadway. The orientation of the roadway can be determined by detecting a line painted on the roadway using an appropriate sensor such as a front mounted camera coupled to the ego vehicle. The process 800 can then proceed to 840.

At 840, the process 800 can cause the at least one driver input range to be displayed to a driver of the ego vehicle. The at least one driver input range can be displayed on an interface such as a video screen, a standalone gauge such as a speedometer, lights such as LED's, or other interfaces coupled to the ego vehicle. In some embodiments, the interfaces can be coupled to a dashboard of the ego vehicle. In some embodiments, the range of permissible speeds can be displayed with a ring around the numbers of a speedometer. The speedometer can be a standalone gauge or displayed as part of a video screen. Portions of the ring can be colored in a first color, such as green, indicating that the speed nearest that portion belongs to the range of permissible speeds. Other portions of the ring can be colored in a second color, such as red, indicating that that the speed nearest that portion does not belong to the range of permissible speeds. The process 800 can then proceed to 844.

At 844, the process 800 can receive driver input data from the plurality of sensors coupled to the ego vehicle at the current time. The driver input data can include information such as values of parameters indicative of a position of one or more driving input controls such an accelerator pedal, a brake pedal, and/or a steering wheel. The process 800 can then proceed to 848.

At 848, the process 800 can determine whether or not the updated driver input data is permissible. The process 800 can calculate a projected longitudinal acceleration value and/or a projected lateral velocity value using the updated driver input data and the previous longitudinal velocity and lateral position of the ego vehicle. For example, if the acceleration pedal is not depressed (i.e., no throttle input), and the ego car is traveling at an arbitrary longitudinal velocity, the process 800 can calculate how much the car will slow down, i.e., accelerate, and output a projected longitudinal acceleration value. If the acceleration pedal is depressed an arbitrary amount and the ego car is traveling at another arbitrary longitudinal velocity, the process 800 can calculate how much the car will slow down or speed up, i.e., accelerate, and output a projected longitudinal acceleration value. After calculating the projected longitudinal acceleration value and/or the projected lateral velocity value, the process compare the projected values to the set of permissible driving inputs. If there is no pair of a longitudinal acceleration value and a lateral velocity value in the set of permissible driving inputs that matches or is within a predetermined tolerance of the projected longitudinal acceleration value and the projected lateral velocity value, the process 800 can determine that the driver input data is not permissible. Otherwise, the process 800 can determine that the driver input data is permissible. The process 800 can then proceed to 852.

At 852, the process 800 can proceed to 856 (i.e., "YES") in response to determining that the driver input data is permissible as determined in 848. The process 800 can proceed to 858 (i.e., "NO") in response to determining that the driver input data is not permissible as determined in 848.

At 856, the process 800 can cause a vehicle control system of the ego vehicle to perform a vehicle maneuver based on the driver input data, and more specifically, whether or not the driver input data is permissible. In response to determining that the driver input data is permissible, the process 800 can provide the driver input data to the vehicle control system and cause the vehicle control system to execute a vehicle maneuver including accelerating, braking, and/or steering as specified by the driver input data. In other words, the vehicle control system will behave as the driver had intended. The process 800 can then proceed to 860.

At 858, the process 800 can compute a replacement input based on the driver input data and cause a vehicle control system of the ego vehicle to perform a maneuver using the replacement input. In response to determining that the driver input data is not permissible, the process 800 can select a target permissible driving input with a pair of a longitudinal acceleration and a lateral velocity from the set of permissible driving inputs, calculate a replacement input data set based on the pair, provide the replacement input data set to the vehicle control system, and cause the vehicle control system to execute a vehicle maneuver including accelerating, braking, and/or steering as specified by the replacement input data set. The process 800 may select a pair of a longitudinal acceleration and a lateral velocity that has a minimum amount of change from the projected longitudinal acceleration value or the projected lateral velocity value. In some embodiments, the driver may have previously set an override preference that indicates if the speed of the ego vehicle should be adjusted or the steering of the ego vehicle should be adjusted, and a permissible driving input can be selected that least changes the speed or steering depending on the override preference. For example, if the override preference is to adjust the speed, the process 800 may search for a pair of a longitudinal acceleration and a lateral velocity whose longitudinal acceleration is closest to the projected longitudinal acceleration value of driver input data. The driver may then feel a less invasive change in operation of the ego vehicle despite the vehicle control system temporarily taking over operation. The process 800 can calculate the replacement input data set by calculating replacement values for the parameters of the driver input data. For example, if the driver input data included positions of an accelerator pedal, a brake pedal, and a steering wheel, the process 800 can calculate replacement values of the positions of the accelerator pedal, the brake pedal, and the steering wheel in order to achieve the pair of the longitudinal acceleration and the lateral velocity. The replacement input data set can include the replacement values. The replacement input data set can then be provided to the vehicle control system, and cause the vehicle control system to execute a vehicle maneuver including accelerating, braking, and/or steering as specified by the replacement input data set. The vehicle maneuver may prevent the ego vehicle from being positioned too close to the lead vehicle. For example, the process 800 can determine that the driver input data is not permissible as a result of the ego vehicle merging prematurely in front of the lead vehicle, and cause the vehicle control system to make the ego vehicle stay in its lane and/or travel straight ahead. In another example, the process 800 can determine that the driver input data is not permissible as a result of the ego vehicle traveling too fast while behind the lead vehicle, and cause the vehicle control system to make the ego vehicle slow down and/or steer away from the lead vehicle. In some embodiments, the process 800 may not replace one or more of the driver input data values based on the override preference. For example, if the override preference is to adjust the speed, the process 800 may set the steering wheel position of the replacement data set to be the same as the steering wheel position of the driver input data. The process 800 can then proceed to 860.

At 860, the process 800 can determine whether or not the ego vehicle is within a threshold distance of the lead vehicle using the lead vehicle information. As described above, the lead vehicle information can be used to determine a location of the lead vehicle relative to the ego vehicle or a headway separation distance between the lead vehicle and the ego vehicle. The threshold distance may be a predefined headway distance between the front of the ego vehicle and the rear of the lead vehicle. In some embodiments, the process 800 can determine that the ego vehicle is within a reaction zone surrounding the lead vehicle using the location of the lead vehicle relative to the ego vehicle. The reaction zone can also include a predetermined area around the lead vehicle as described above and shown in FIG. 2. The reaction zone can include areas in front of the lead vehicle, which may prevent the ego vehicle from merging in front of the lead vehicle prematurely. The process 800 can then proceed to 864.

At 864, the process 800 can proceed to 868 in response to determining that the ego vehicle is within a threshold distance of the lead vehicle (i.e., "YES" at 864). The process 800 can end in response to determining that the ego vehicle is not within a threshold distance of the lead vehicle (i.e., "NO" at 864).

At 868, if the process 800 did not infer an intention during the previous execution of 820 (i.e., "NO" at 868), the process 800 can proceed to 820. If the process 800 did infer an intention during the previous execution of 820 (i.e., "YES" at 868), the process 800 can proceed to 832.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIG. 8 can be executed or performed in any order or sequence not limited to the order and sequence shown and described in the figures. Also, some of the above steps of the processes of FIG. 8 can be executed or performed substantially simultaneously where appropriate or in parallel to reduce latency and processing times.

Thus, the invention provides an improved method of monitoring a human driver driving an ego vehicle while overtaking a lead vehicle.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

REFERENCES

[1] M. Althoff and J. M. Dolan. Online verification of automated road vehicles using reachability analysis. IEEE Trans. on Robotics, 30(4), 2014.

[2] A. D. Ames, X. Xu, J. W. Grizzle, and P. Tabuada. Control Barrier Function Based Quadratic Programs for Safety Critical Systems. IEEE Trans. on Autom. Control, 62(8):3861-3876, 2017.

[3] S. Bansal, M. Chen, S. Herbert, and C. J. Tomlin. Hamiltonjacobi reachability: A brief overview and recent advances. In CDC, pages 2242-2253. IEEE, 2017.

[4] D. P. Bertsekas. Infinite Time Reachability of State-Space Regions by Using Feedback Control. IEEE Trans. on Autom. Control, 17(5):604-613, 1972.

[5] F. Blanchini. Set invariance in control. Automatica, 35(11):1747-1767, 1999.

[6] Y. Chen, N. Sohani, and H. Peng. Modelling of uncertain reactive human driving behavior: a classification approach. In CDC, pages 3615-3621. IEEE, 2018.

[7] S. Cheong and I. R. Manchester. Input design for discrimination between classes of lti models. Automatica, 53:103-110, 2015.

[8] E. De Santis, M. D. Di Benedetto, and L. Berardi. Computation of maximal safe sets for switching systems. IEEE Trans. on Autom. Control, 49(2):184-195, 2004.

[9] Y. Ding, F. Harirchi, S. Yong, E. Jacobsen, and N. Ozay. Optimal input design for affine model discrimination with applications in intention-aware vehicles. In ICCPS, pages 297-307. IEEE, 8 2018.

[10] F. Harirchi, S. Z. Yong, and N. Ozay. Passive diagnosis of hidden-mode switched affine models with detection guarantees via model invalidation. In Diagnosability, Security and Safety of Hybrid Dynamic and Cyber-Physical Systems, pages 227-251. Springer, 2018.

[11] M. Herceg, M. Kvasnica, C. Jones, and M. Morari. Multi-Parametric Toolbox 3.0. In ECC, pages 502-510, Zurich, Switzerland, Jul. 17-19 2013. http://control.ee.ethz.ch/~mpt.

[12] P. Kumar, M. Perrollaz, S. Lefevre, and C. Laugier. Learning-based approach for online lane change intention prediction. In IEEE Int. Veh. Sym., pages 797-802, June 2013.

[13] X. Ma, K. Driggs-Campbell, and M. J. Kochenderfer. Improved robustness and safety for autonomous vehicle control with adversarial reinforcement learning. In IEEE Int. Veh. Symp., pages 1665-1671. IEEE, 2018.

[14] T.-H. D. Nguyen, D. Hsu, W. S. Lee, T.-Y. Leong, L. P. Kaelbling, T. Lozano-Perez, and A. H. Grant. Capir: Collaborative action planning with intention recognition. In AIIDE, 2011.

[15] P. Nilsson, O. Hussien, A. Balkan, Y. Chen, A. D. Ames, J. W. Grizzle, N. Ozay, H. Peng, and P. Tabuada. Correct-by-construction adaptive cruise control: Two approaches. IEEE Trans. on Control Syst. Technol., 24(4):1294-1307, 2016.

[16] M. O'Kelly, H. Abbas, and R. Mangharam. Computer-aided design for safe autonomous vehicles. In RWS, 2017, pages 90-96. IEEE, 2017.

[17] C. Pek and M. Althoff. Efficient computation of invariably safe states for motion planning of self-driving vehicles. In IROS, pages 3523-3530. IEEE, 2018.

[18] M. Rungger and P. Tabuada. Computing robust controlled invariant sets of linear systems. IEEE Trans. Autom. Control, 62(7):3665-3670, July 2017.

[19] D. Sadigh, S. S. Sastry, S. A. Seshia, and A. Dragan. Information gathering actions over human internal state. In IROS, pages 66-73. IEEE, 2016.

The citation of any document is not to be construed as an admission that it is prior art with respect to the present invention.

What is claimed is:

1. A method in a data processing system comprising at least one processor and at least one memory, the at least one memory comprising instructions executed by the at least one processor to implement a vehicle overtaking monitoring system, the method comprising:
   receiving, from a first plurality of sensors coupled to an ego vehicle, lead vehicle data about a lead vehicle;
   inferring an estimated intention of the lead vehicle based on the lead vehicle data;
   selecting an intention model from a plurality of intention models based on the estimated intention;
   calculating a set of permissible driving inputs of the ego vehicle based on the intention model;
   calculating at least one driver input range based on the set of permissible driving inputs; and
   causing the at least one driver input range to be displayed to a driver of the ego vehicle.

2. The method of claim 1 further comprising:
   receiving, from a second plurality of sensors coupled to the ego vehicle, ego vehicle data about the ego vehicle,
   wherein the set of permissible driving inputs is further calculated based on the ego vehicle data.

3. The method of claim 2, wherein the first plurality of sensors and the second plurality of sensors include a common sensor.

4. The method of claim 2 further comprising:
   calculating a state of the ego vehicle and the lead vehicle based on the ego vehicle data and the lead vehicle data,
   wherein the set of permissible driving inputs is further calculated based on the state of the ego vehicle and the lead vehicle.

5. The method of claim 2, wherein the ego vehicle data comprises a velocity of the ego vehicle and a position of the ego vehicle, and the lead vehicle data comprises a velocity of the lead vehicle.

6. The method of claim 1, wherein each permissible driving input of the set of permissible driving inputs comprises a longitudinal acceleration of the ego vehicle and a lateral velocity of the ego vehicle.

7. The method of claim 1, wherein the at least one driver input range comprises a range of longitudinal vehicle velocities of the ego vehicle.

8. The method of claim 1 further comprising:
   determining that the ego vehicle is within a threshold distance of the lead vehicle,
   wherein the plurality of intention models comprises an annoying intention model corresponding to the lead vehicle speeding up when the ego vehicle is within the threshold distance, and a cautious intention model corresponding to the lead vehicle slowing down when the ego vehicle is within the threshold distance.

9. The method of claim 8, wherein each intention model of the plurality of intention models comprises a robust controlled invariant set calculated based on a dynamics model associated with one of the annoying intention model or the cautious intention model.

10. A method in a data processing system comprising at least one processor and at least one memory, the at least one memory comprising instructions executed by the at least one processor to implement a vehicle overtaking monitoring system, the method comprising:
    receiving, from a first plurality of sensors coupled to an ego vehicle, lead vehicle data about a lead vehicle;
    estimating an intention of the lead vehicle based on the lead vehicle data;
    selecting a target intention model from a plurality of intention models based on the estimated intention;
    calculating a set of permissible driving inputs of the ego vehicle based on the target intention model;
    receiving, from a second plurality of sensors coupled to the ego vehicle, driver input data;
    determining that the driver input data is not permissible based on the set of permissible driving inputs; and
    causing a vehicle control system of the ego vehicle to perform a vehicle maneuver in response to determining that the driver input data is not permissible.

11. The method of claim 10, wherein each intention model of the plurality of intention models comprises a robust controlled invariant set calculated based on a dynamics model associated with the intention model.

12. The method of claim 10, wherein each permissible driving input of the set of permissible driving inputs has a plurality of permissible values corresponding to predetermined operational parameters of the ego vehicle, and the method further comprises:
    calculating a projected driving input based on the driver input data, the projected driving input having a plurality of projected values corresponding to predetermined operational parameters;
    selecting a target permissible driving input from the set of permissible driving inputs, wherein the target permissible driving input has at least one permissible value that matches a corresponding projected value of the projected driving input; and
    calculating the vehicle maneuver based on the target permissible driving input.

13. The method of claim 12, wherein the target permissible driving input and the corresponding projected value each correspond to a preferred operational parameter selected by a driver of the ego vehicle.

14. The method of claim 10, wherein each permissible driving input of the set of permissible driving inputs comprises a longitudinal acceleration of the ego vehicle and a lateral velocity of the ego vehicle.

15. The method of claim 10 further comprising:
- determining that the driver input data is permissible based on the set of permissible driving inputs; and
- providing the driver input data to the vehicle control system in response to determining that the driver input data is permissible.

16. A driving control system for an ego vehicle, the driving control system comprising:
- a first plurality of sensors coupled to the ego vehicle; and
- a controller in electrical communication with the first plurality of sensors, the controller being configured to execute a program to:
- receive, from the first plurality of sensors coupled to the ego vehicle, lead vehicle data about a lead vehicle;
- estimate an intention of the lead vehicle based on the lead vehicle data;
- select an intention model from a plurality of intention models based on the estimated intention, the intention model having an associated inherent intention;
- calculate a set of permissible driving inputs of the ego vehicle based on the intention model;
- calculate at least one driver input range based on the set of permissible driving inputs; and
- cause the at least one driver input range to be displayed to a driver of the ego vehicle.

17. The system of claim 16 further comprising:
- a second plurality of sensors coupled to the ego vehicle, wherein the controller is further configured to receive ego vehicle data about the ego vehicle from the second plurality of sensors coupled to the ego vehicle, and wherein the set of permissible driving inputs is further calculated based on the ego vehicle data.

18. The system of claim 16 wherein:
- the controller is further configured to determine that the ego vehicle is within a threshold distance of the lead vehicle, and the plurality of intention models comprises an annoying intention model corresponding to the lead vehicle speeding up when the ego vehicle is within the threshold distance, and a cautious intention model corresponding to the lead vehicle slowing down when the ego vehicle is within the threshold distance.

19. The system of claim 18, wherein each intention model of the plurality of intention models comprises a robust controlled invariant set calculated based on a dynamics model associated with one of the annoying intention model or the cautious intention model.

20. The system of claim 16 further comprising:
- a second plurality of sensors coupled to the ego vehicle, wherein the controller is further configured to:
- receive, from the second plurality of sensors, driver input data;
- determine that the driver input data is not permissible based on the set of permissible driving inputs; and
- cause a vehicle control system of the ego vehicle to perform a vehicle maneuver in response to determining that the driver input data is not permissible.

\* \* \* \* \*

UNITED STATES PATENT AND TRADEMARK OFFICE
CERTIFICATE OF CORRECTION

PATENT NO. : 11,242,059 B2
APPLICATION NO. : 16/394508
DATED : February 8, 2022
INVENTOR(S) : Necmiye Ozay et al.

It is certified that error appears in the above-identified patent and that said Letters Patent is hereby corrected as shown below:

In the Specification

Column 8, Line 62, "$a_{e,x}$" should be --$\alpha_{e,x}$--.

Column 8, Line 63, "$a_{L,x}$" should be --$\alpha_{L,x}$--.

Column 9, Line 31, "$a_{L,x}{}^{max} = -\!-a_{L,x}{}^{min}$" should be --$\alpha_{L,x}^{max} = -\alpha_{L,x}^{min}$--.

Column 11, Line 7, "$a_{L,x}$" should be --$\alpha_{L,x}$--.

Column 11, Line 28, "$i \in \{a,c\}$" should be --$i \in \{\alpha,c\}$--.

Column 11, Line 51, "$i \in \{a,c\}$" should be --$i \in \{\alpha,c\}$--.

Column 16, Line 56, "RC IS" should be --RCIS--.

Signed and Sealed this
Twenty-third Day of May, 2023

Katherine Kelly Vidal
*Director of the United States Patent and Trademark Office*